(12) United States Patent
Lanni

(10) Patent No.: US 7,254,048 B2
(45) Date of Patent: *Aug. 7, 2007

(54) POWER SUPPLY CAPABLE OF AC AND DC INPUT UTILIZING WINDING OF TRANSFORMER AS BOOST INDUCTOR

(75) Inventor: Thomas W Lanni, Laguna Niguel, CA (US)

(73) Assignee: Comarco Wireless Technologies, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/593,244

(22) Filed: Nov. 6, 2006

(65) Prior Publication Data

US 2007/0053211 A1 Mar. 8, 2007

Related U.S. Application Data

(63) Continuation of application No. 10/600,262, filed on Jun. 20, 2003, now Pat. No. 7,148,659.

(51) Int. Cl.
*H02M 1/10* (2006.01)
*H02M 3/335* (2006.01)
(52) U.S. Cl. ............... 363/142; 363/26; 363/133; 363/134; 307/72
(58) Field of Classification Search ............... 363/142, 363/26, 24, 133, 134; 307/64, 66, 72, 73, 307/75
See application file for complete search history.

(56) References Cited

U.S. PATENT DOCUMENTS

| 5,060,130 | A | 10/1991 | Steigerwald | 363/65 |
| 5,119,283 | A | 6/1992 | Steigerwald | 363/37 |
| 5,283,727 | A | 2/1994 | Kheraluwala et al. | 363/37 |
| 5,731,693 | A | 3/1998 | Furmanczyk | 307/64 |
| 5,901,056 | A | 5/1999 | Hung | 363/142 |
| 5,946,202 | A | 8/1999 | Balogh | 363/26 |
| 6,137,280 | A | 10/2000 | Ackermann et al. | 323/354 |
| 6,225,708 | B1 | 5/2001 | Furuawa et al. | 307/66 |
| 6,434,029 | B1 | 8/2002 | Cyr et al. | 363/86 |
| 6,483,730 | B2 | 11/2002 | Johnson, Jr. | 307/66 |
| 6,643,158 | B2 | 11/2003 | McDonald et al. | 363/142 |
| 6,768,223 | B2 | 7/2004 | Powell et al. | 307/64 |

FOREIGN PATENT DOCUMENTS

DE 2 027 405 12/1971

OTHER PUBLICATIONS

European Search Report for Corresponding Patent Application No. 04253655.7 dated Jun. 30, 2006.

*Primary Examiner*—Bao Q. Vu
(74) *Attorney, Agent, or Firm*—Pillsbury Winthrop Shaw Pittman LLP

(57) ABSTRACT

A programmable AC/DC power converter receives a plurality of input voltages and outputs a single voltage from an input voltage system. A transformer receives the single voltage. One of the plurality of input voltages is provided at a center tap of a secondary winding of the transformer. A transformed voltage is output. A rectifier receives the transformed voltage and outputs a DC voltage. A buck regulator receives a DC voltage, creates a regulated voltage, and outputs the regulated voltage and a regulated current to a portable appliance. A error correction system receives a programming signal and regulated signals and verifies that the regulated signal to programming signal ratio is within an acceptable range.

20 Claims, 24 Drawing Sheets

POWER SUPPLY CAPABLE OF AC AND DC INPUT UTILIZING WINDING OF TRANSFORMER AS BOOST INDUCTOR

RELATED APPLICATIONS

This application is a continuation of application Ser. No. 10/600,262, filed Jun. 20, 2002, now U.S. Pat. No. 7,148,659

The following United States patents and patent applications are incorporated by reference. U.S. Patent Application Entitled "Common Mode Noise Cancellation Circuit, application Ser. No. 10/452,162, filed May 30, 2003; U.S. Patent Application Entitled "Active Tip", application Ser. No. 10/313,662, filed Dec. 5, 2002; U.S. Patent Application Entitled "Programmable Tip", application Ser. No. 10/313,793, filed Dec. 5, 2002; U.S. Pat. No. 5,838,554, entitled "Improved Small Form Factor Power Supply", filed Dec. 19, 1997; U.S. Pat. No. 5,949,213, entitled "Method and System for Recharging Batteries", filed Dec. 16, 1998; U.S. Pat. No. 6,172,884, entitled "Programmable Power Supply," filed May 12, 1999; U.S. Pat. No. 6,266,261, entitled "DC Power Adapter System," filed Apr. 3, 2000.

BACKGROUND

1. Technical Field

This invention relates to the receiving of the plurality of input voltages and the output of a single regulated voltage.

2. Discussion of the Related Art

Generally, in power supplies, in order to a plurality of voltages, at least two distinct converter circuits are needed to produce an output voltage. This results in greater circuit complexity, larger physical size, and increased weight.

DETAILED DESCRIPTION

Figure 1A:
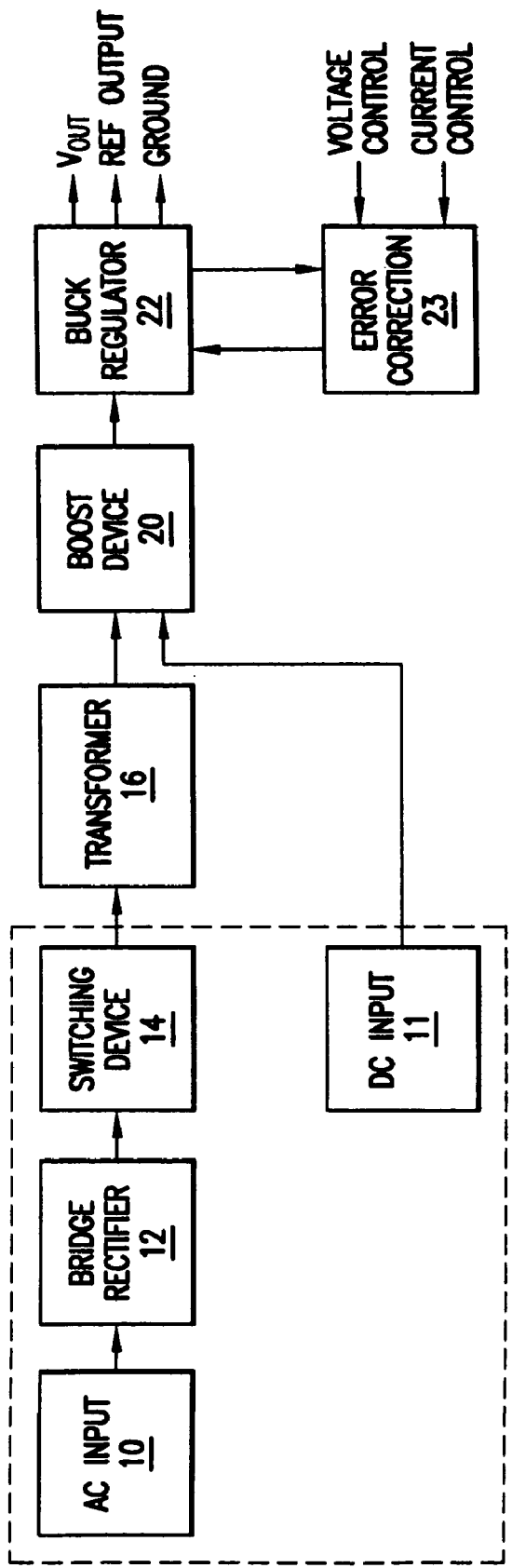
FIG. 1(a) illustrates a block diagram of a programmable AC/DC power supply according to an embodiment of the present invention.
Figure 1B:
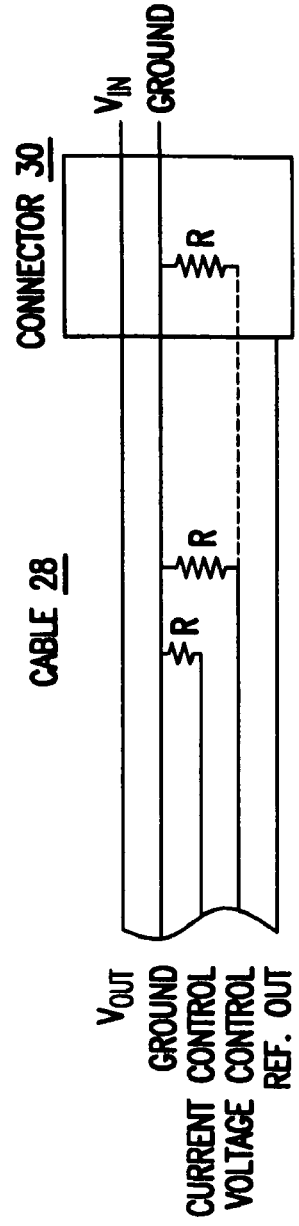
FIG. 1(b) illustrates a cable and a connector according to an embodiment of the present invention.

FIG. 1(a) illustrates a block diagram of a programmable AC/DC power supply according to an embodiment of the present invention. The power supply may include an input voltage system 24, a transformer 16, a boost device 20 utilizing a secondary winding of the transformer 16, and a buck regulator 22. The input voltage system 24 may include an AC input source 10, a bridge rectifier 12, and a switching device 14. The input voltage system 24 may also include a DC input source 11. The input voltage system may receive a plurality of input voltages. Under certain operating conditions, the input voltage system may receive the plurality of input voltages one at a time. Under other operating conditions, the input voltage system may receive the plurality of input voltages simultaneously. The programmable power supply may deliver an output voltage and an output current to a portable appliance, such as a personal computer, a cell phone, or a personal digital assistant. In an embodiment of the invention, the portable appliance may be coupled to the power supply via a cable 28, as illustrated in FIG. 1(b). In an embodiment of the invention, the portable appliance may be coupled to a power supply via a cable 28 and a connector 30. The combination of the power supply and the cable 28, or the power supply, the cable 28, and the connector 30 may be referred to as a power system. In an embodiment of the present invention, the connector 30 may be detachable from the cable 28. The detachable connector 30 may be referred to as a tip. The cable 28 or the cable 28 and the connector 30 may provide the output voltage and the output current to the device.

In an embodiment of the invention, the input voltage system 24 of the power supply may receive an AC voltage from an AC input source 10. The bridge rectifier 12 may receive the AC voltage and may output a DC voltage. The switching device 14 may receive the DC voltage and may output a switched voltage. The transformer 16 may receive the switched voltage at a primary winding (not shown) and an intermediate voltage may be coupled to a secondary winding (not shown). The secondary winding of the transformer 16 may be utilized as a boost inductor for a boost device 20. The boost device 20, utilizing the secondary winding of the transformer as the boost inductor, may receive the intermediate voltage and may output a transformed voltage. Under certain operating conditions, the transformed voltage output from the boost device 20 may be increased when compared to the intermediate voltage appearing on the secondary winding. Under other operating conditions, the transformed voltage output from the boost device 20 may be decreased when compared to the intermediate voltage appearing on the secondary winding. The boost circuit 20, utilizing the secondary winding of the transformer as a boost inductor, may also receive a DC input from the DC input source 11 and may output a transformed voltage. In one embodiment of the present invention, the boost circuit 20, utilizing the secondary winding of the transformer as the boost inductor, may output a transformed voltage that is approximately two times the intermediate voltage value. The use of the secondary winding of the transformer as the boost inductor may reduce the number of magnetic components necessary within the power supply.

The buck regulator 22 may receive the transformed voltage, may generate a regulated voltage, and may output the regulated voltage and a regulated current to the cable 28. The regulated voltage and the regulated current may be the output voltage and the output current supplied to the portable appliance. The regulated voltage and the regulated current may also be input to an error correction system 23. The error correction system 23 of the buck regulator 22 may compare one of the regulated signals, i.e., a regulated voltage and a regulated current, to a corresponding one of reference signals, i.e., a reference voltage and a reference current. The reference signals are related to programming signals, i.e., a programming voltage and a programming current. If the regulated signal to programming signal ratio, the error correction system 23 may transmit a correction signal to the buck regulator 22 to modify the magnitude of the regulated signal. Illustratively, if the regulated voltage to programming voltage is not within an acceptable range, the error correction system 23 may transmit a voltage correction signal to the buck regulator 22 to modify a magnitude of the regulated voltage. Similarly, if the regulated current to programming current ratio is not within an acceptable range, the error correction system 23 may transmit a current correction signal to the buck regulator 22 to modify the magnitude of the regulated current.

The buck regulator 22 may receive a programming signal from the coupling of the cable 28 to the power supply. The programming signal may be a programming voltage or the programming signal may be a programming current. The error correction system 23 may determine if a regulated signal to programming signal ratio is within an acceptable range. Illustratively, the error correction system 23 may determine if the regulated voltage to programming voltage is within an acceptable range. If it is not, the error correction system 23 may transmit a voltage correction signal to the buck regulator 22. Similarly, the error correction system 23 may determine if the regulated current to programming current is within an acceptable range. If it is not, the error correction system 23 may transmit a current correction signal to the buck regulator 22.

FIG. 1(b) illustrates a cable and a connector according to an embodiment of the present invention. The magnitude of a programming signal may be dependent upon a value of a resistor located in a cable 28 coupled to the power supply. In an embodiment of the invention, the magnitude of the programming signal may be dependent upon a value of a resistor located in a connector 30 coupled to the cable 28 and the power supply. In an embodiment of the invention, one or more resistors may be installed in one of the cable 28 and the connector 30. The installation of the one or more resistors in the one of the cable 28 and the connector 30 and the coupling of the cable 28 or the cable 28 and the connector 30, may change the magnitude of the programming signal to be transmitted to the error correction system 23. Further discussion of the resistors within the cable 28 and the connector 30 are found in the following patents, which are incorporated by reference: U.S. Pat. No. 5,838,554, entitled "Improved Small Form Factor Power Supply", filed Dec. 19, 1997; U.S. Pat. No. 5,949,213, entitled "Method and System for Recharging Batteries", filed Dec. 16, 1998; U.S. Pat. No. 6,172,884, entitled "Programmable Power Supply," filed May 12, 1999; and U.S. Pat. No. 6,266,261, entitled "DC Power Adapter System," filed Apr. 3, 2000.

For example, the installation of one or more of the resistors in the cable 28 may cause a change in the magnitude of the programming signal that is transmitted to the error correction system 23. In an embodiment of the invention, the one or more resistors may also be installed within the connector 30 coupled to the cable 28, and this may cause a change in the magnitude of the programming signal that is transmitted to the error correction system 23. Illustratively, the one or more resistors may be coupled between a line in the cable or connector coupled to voltage control input and a line in the cable or connector coupled to ground. Illustratively, the one or more resistors may be coupled between a line in the cable or connector coupled to current control input and a line in the cable or connector coupled to ground.

Alternatively, a programming signal may be transmitted from an active device in the cable 28 or from an active device in the connector 30. The active device may be a controller or an operational amplifier. The active device may transmit the programming signal to the error correction system 23 of the buck regulator 22. Further discussion of the active device is provided in the following patent applications, which are incorporated by reference: application Ser. No. 10/313,662, filed May 30, 2003; U.S. Patent Application Entitled "Active Tip", application Ser. No. 10/313,793, filed Dec. 6, 2002; U.S. Patent Application Entitled "Programmable Tip."

Figure 1C:
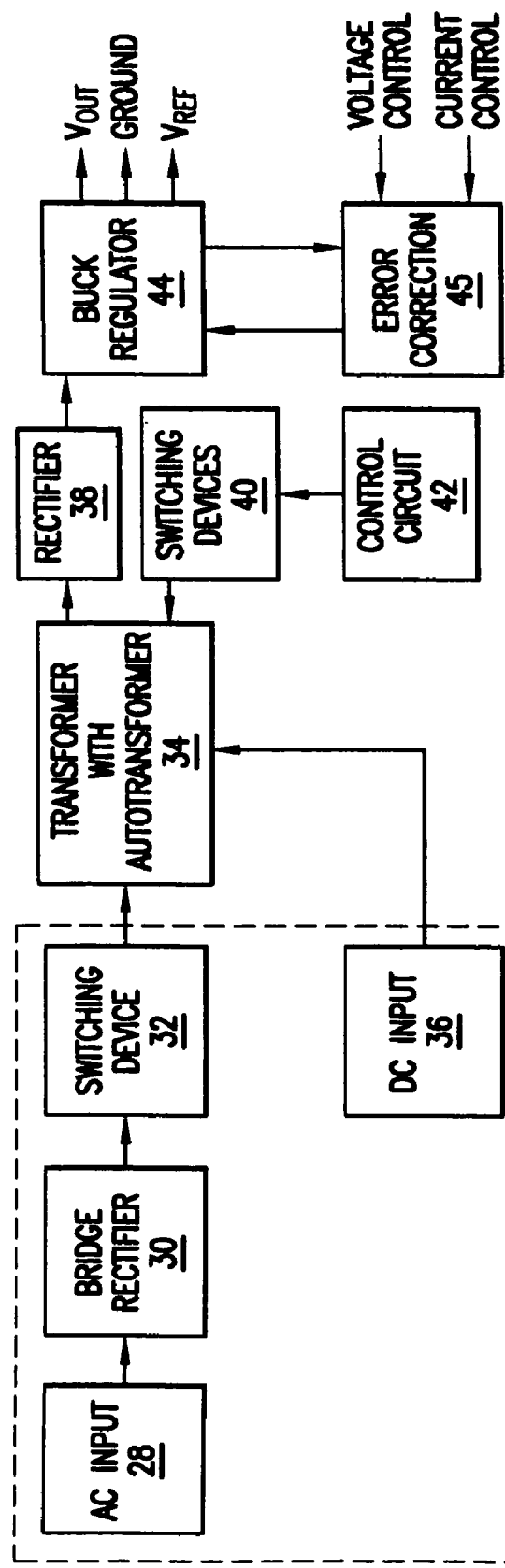
FIG. 1(c) illustrates a block diagram of a programmable AC/DC power supply utilizing an autotransformer according to an embodiment of the present invention.

FIG. 1(c) illustrates a second embodiment of a programmable AC/DC power supply in a power system according to an embodiment of the present invention. The power supply may include an input voltage system 27, a transformer with an autotransformer 34, a control circuit 42, at least two switching devices 40, a rectifying device 38, a buck regulator 44, and an error correction system 45. The input voltage system 27 may include an AC input source 28, a bridge rectifier 30, and one or more switching devices 32. The input voltage system 27 may include a DC input source 36. The secondary winding of the transformer 34 may be configured as an autotransformer. The secondary winding may have a center tap to which a DC input source 36 is coupled.

The power supply may receive an AC voltage from an AC input source 28. The bridge rectifier 30 may receive the AC voltage and may output a DC voltage. The switching device 32 may receive the DC voltage and may output a switched voltage. The transformer 34 may receive the switched voltage at a primary winding (not shown) and may induce an intermediate voltage to a secondary winding (not shown). The secondary winding of the transformer 34 may output the transformed voltage. The rectifying circuit 38 may receive the transformed voltage and may output a rectified DC voltage. The secondary winding of the transformer 34 may be configured as an autotransformer such that the secondary winding includes a first autowinding (not shown) and a second autowinding (not shown).

The power supply may receive a DC input voltage from a DC input source 36. The DC input voltage may be coupled to the center tap of the transformer. The control circuit 42 may drive the switching devices 40 to utilize the secondary winding to multiply the DC input voltage and create a transformed voltage. The rectifying device 38 may receive the transformed voltage and may create a DC voltage. The buck regulator 44 may receive the DC voltage and may output a regulated voltage and a regulated current.

The duty cycle of the control circuit 42 may determine the magnitude of the transformed voltage. Illustratively, if the duty cycle of the control circuit is 50%, then the magnitude of the transformed voltage may be twice the DC voltage. The delivery of the regulated voltage and the regulated current to the portable appliance may occur as discussed above in relation to the power system disclosed in FIG. 1(a). Similarly, the cable 28 or the cable 28 and the connector 30 may be utilized as discussed previously in relation to the power system disclosed in FIGS. 1(a) and 1(b).

Figure 2:
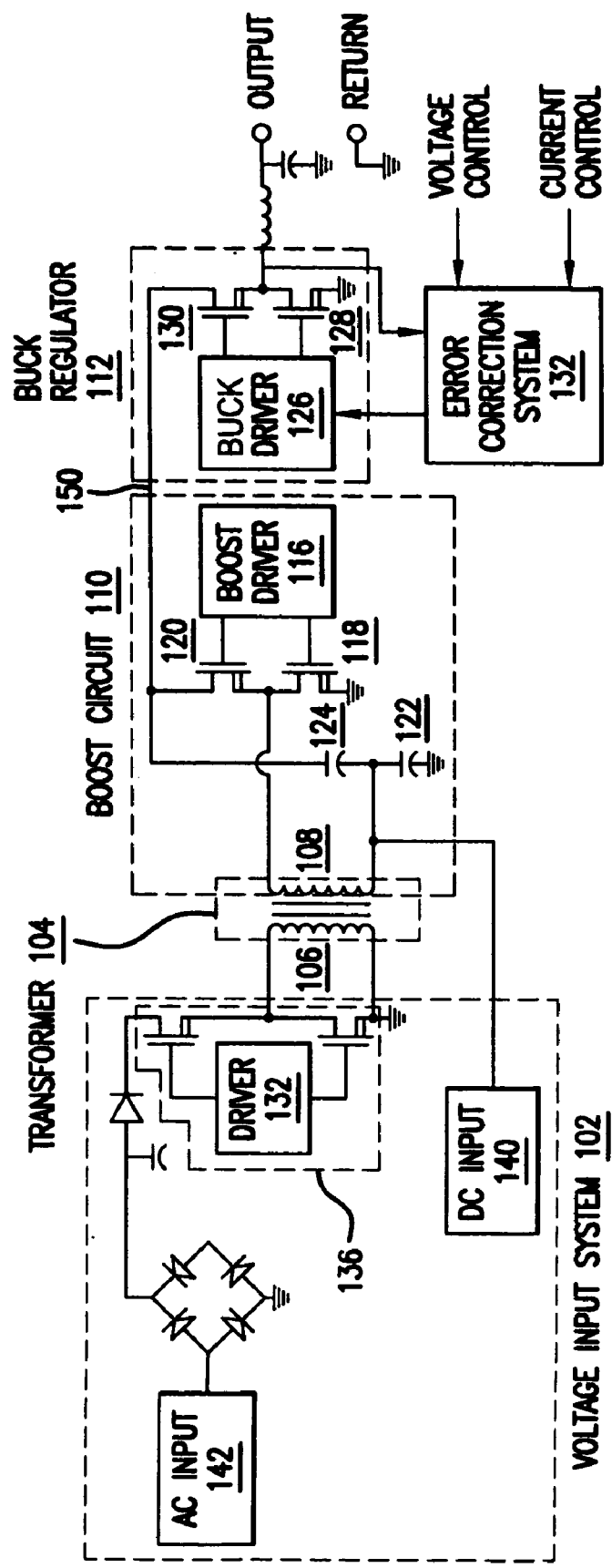
FIG. 2 illustrates a first embodiment of a programmable power converter according to an embodiment of the present invention.

FIG. 2 illustrates a programmable power converter according to an embodiment of the present invention. The power converter may include a voltage input subsystem 102, a transformer 104 including primary winding 106 and a secondary winding 108, a boost circuit 110 that utilizes the secondary winding 108 as a boost inductor, a buck regulator 112, and an error correction system 132. The boost circuit 110 may also include a boost driving device 116, a first capacitor 122, a second capacitor 124, a first switching device 118, and a second switching device 120. The buck circuit 112 may include a buck driving device 126, a third switch 128, and a fourth switch 130.

The input voltage system 102 may receive a plurality of input voltages. In an embodiment of the invention, one of the plurality of input voltages may be input from an AC input source 142. In an embodiment of the invention, one of the plurality of inputs voltages may be from a DC input source 140. In an alternative embodiment of the invention, the input voltage subsystem 102 may include an AC input source 142 and a DC input source 140.

If AC input source 142 is one of the plurality of input voltages, a bridge rectifier 134 receives the AC voltage and outputs a DC voltage. A switching device 136 receives the DC voltage and outputs a switched voltage. In an embodiment of the invention, the switching device 136 may include a pair of switches, as illustrated in FIG. 2. In an embodiment of the invention, the switching device 136 may include one switch or a plurality of switches, i.e., more than two. The transformer 104 may receive the switched voltage at the primary winding 106. Depending on the number of turns in the primary winding 106 in comparison to the number of turns in the secondary winding 108, i.e., the primary-to-secondary turn ratio, the switched voltage may be increased or decreased to create an intermediate voltage. The intermediate voltage may be output from the secondary winding 108. Illustratively, the switched voltage may be a square-wave having a magnitude of 300 volts peak-to-peak value or having a magnitude of 150 volts root mean squared (RMS). For example, if the primary-to-secondary turn ratio is 10:1 and the alternating input voltage may measure 150 volts RMS, the intermediate voltage may have a magnitude of 15 volts RMS.

A boost circuit 110 may be coupled to the transformer 104, specifically the secondary winding 108 of the transformer 104. The boost circuit 110 may utilize the secondary winding 108 of the transformer as the boost inductor for the boost circuit 110. The boost circuit 110 may receive the intermediate voltage, modify the value of the intermediate voltage, and output a transformed voltage that is present at node 150. The magnitude of the transformed voltage that is output by the boost circuit 110 may be determined by a duty cycle of the first switch 118 and a duty cycle of the second switch 120 of the boost circuit 110. The duty cycle of the first switch 118 and the duty cycle of the second switch 120 may be controlled by the boost driving device 116. For example, if the duty cycle of the switches 118 and 120 of the boost circuit 110 is 50%, then the magnitude of the transformed voltage may be boosted by a factor of two from the intermediate voltage. In an embodiment of the invention, the duty cycle of the first switch 118 and the second switch 120 in the boost circuit 110 is fixed. For example, a RC circuit may determine the duty cycle of the first switch 118 and the second switch 120. Under alternative operating conditions, the duty cycle of the first switch 118 and the second switch 120 in the boost circuit 110 may be variable. In an embodiment, a signal or signals from an error correction subsystem 132 may assist in determining the duty cycle of the first switch 118 and the second switch 120 in the boost circuit 110. Illustratively, a pulse width modulator may receive a signal from the regulator along with a second signal from an oscillating device and may output a signal to the boost driving device 116 of the boost circuit 110

If a DC input source 140 is one of the plurality of input voltages, the boost circuit 110 may receive the input voltage from the DC input source 140. Illustratively, the DC input voltage may be supplied, for example, from a battery, a car, a train, or an airplane. The boost circuit 110 may increase the value of the DC input voltage and may output a transformed voltage. The boost circuit 110 may utilize the secondary winding 108 as the boost inductor for the boost circuit 110. As discussed above, the magnitude of the transformed voltage present at node 150 in comparison to the DC input voltage may be controlled by the duty cycle of the switches 118 and 120 in the boost circuit 110. Illustratively, if the duty cycle of the switches 118 and 120 is 50%, then the magnitude of the transformed voltage may be twice the magnitude of the DC input voltage.

The buck regulator 112 may receive the boosted voltage from the boost circuit 110. The buck regulator 112 may modify the magnitude of the transformed voltage to create a regulated voltage. The buck regulator 112 may output the regulated voltage as the output voltage at the output terminal and may also a deliver an output current to the output terminal. The duty cycle of the third switching device 128 and the fourth switching device 130 in the buck regulator 112 may control the magnitude of the regulated voltage. The third switching device may be referred to a pass switch 130 and the fourth switching device may be referred to as a shunt switch 128. For example, if the duty cycle of a pass switch 130 in the buck circuit 112 is approximately equal to 0.70, the magnitude of the regulated voltage may be equal to approximately 0.70 multiplied by the transformed voltage. The duty cycle of the buck regulator 112 may be determined by the buck driving device 126. The buck driving device 126 may be set to a fixed duty cycle, e.g., 50% duty cycle. Alternatively, the buck driving device 126 may be set to a variable duty cycle in the same manner as discussed above.

An error correction system 132 may regulate the external output voltage by comparing it to a reference voltage. Under certain operating conditions, the error correction system 132 may receive the regulated voltage and may compare it to a reference voltage. For example, if the portable appliance requires 24 volts DC, then a reference voltage may be established to regulate the regulated voltage. If the regulated voltage is not within an acceptable range of the reference voltage, then the error correction subsystem may transmit a voltage correction signal to the buck regulator 112 to adjust the duty cycles of the pass switch 130 and the shunt switch 128. For example, if the output voltage is 20 volts, the portable appliance requires 25 volts, only the buck regulator 112 is regulating the output voltage, and the duty cycle of the pass switch 130 is 0.70, then the correction signal to the buck regulator 112 may set the duty cycle of the pass switch 130 to be increased to approximately 0.85 in order to drive the regulated voltage to the required 25 volts.

In an embodiment of the invention, the modification signal may also be input to the driving device 116 of boost circuit 110 to modify the duty cycle of the first switch 118 and the second switch 120. The modification of the duty cycle of the switching device in the boost circuit 110 may increase or decrease the transformed voltage input to the buck circuit 110.

In an embodiment of the invention, the error correction system 132 may regulate the output signals, i.e., the output current and the output voltage. The error correction system 132 may regulate one of the regulated signals by verifying that the one of the regulated signals maintain a regulated signal to programming signal ratio. If the regulated signal to programming signal ratio is not within an acceptable range, the error correction system 132 may transmit a correction signal to the buck regulator 112 to regulate the regulated signal within the acceptable range of the regulated signal to programming signal ratio. Illustratively, the error correction system 132 may regulate the regulated voltage and verify that the regulated voltage to programming voltage ratio is within an acceptable range. If the regulated voltage is not within the acceptable range, the error correction system 132 may transmit a voltage correction signal to the buck regulator 112 to modify the regulated voltage to be within the acceptable range of the regulated voltage to programming voltage ratio.

Figure 3:
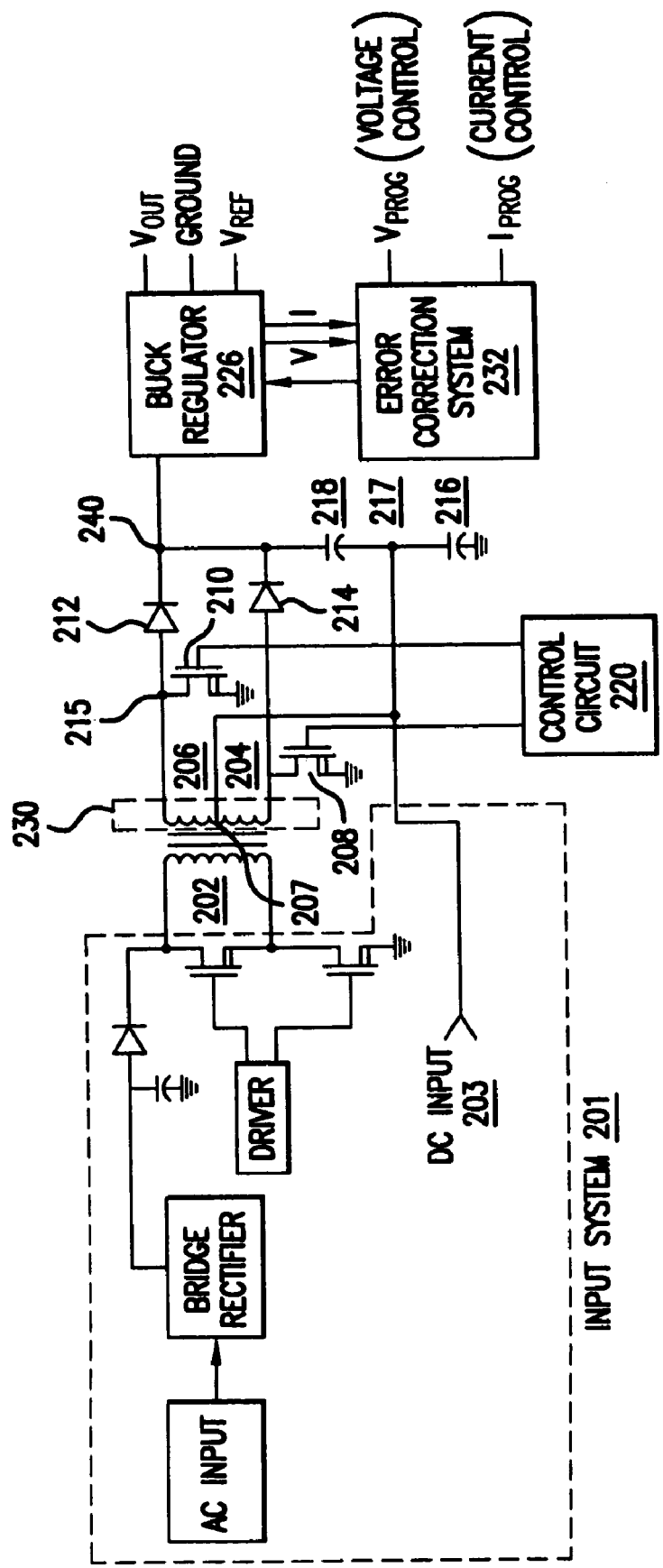
FIG. 3 illustrates a second embodiment of a voltage converter according to an embodiment of the invention.

FIG. 3 illustrates a second embodiment of a voltage converter according to an embodiment of the invention. The voltage converter includes an input voltage system 201, a transformer 203, a control circuit 220, at least two switching devices 208 and 210, and at least at least two diodes 212 and 214. The voltage converter may also include a first capacitor 216 and a second capacitor 218. In an embodiment of the invention, the voltage converter may include a buck regulator 226 and an error correction subsystem 232.

The input voltage system 201 may receive a plurality of input voltages. If an AC input source is one of the plurality of input voltages, a switched voltage is output from the AC input source through the bridge rectifier to the transformer 204 in the same manner as discussed above regarding FIG. 2. In an embodiment of the invention, the switched voltage may be a squarewave. The transformer 202 outputs a transformed voltage across the seconding winding 230. The magnitude of the transformed voltage is the magnitude of the switched voltage multiplied by the number of total turns of the secondary winding divided by the number of turns of the primary winding. For example, if the primary to secondary turns ratio is 15:1, i.e., the secondary-to-primary turns ratio is 1:5, and the switched voltage is equal to 150 volts RMS, the transformed voltage is equal to 30 volts RMS. A rectifying circuit may be formed by the first diode 212 and the second diode 214. The rectifying circuit may receive the transformed voltage, rectify the transformed voltage, and output a DC voltage. Illustratively, if the transformed voltage is 30 volts RMS and is a squarewave, then the DC voltage is 30 volts.

The buck regulator 226 may receive the DC voltage, modify the DC voltage, and output a regulated voltage. The buck regulator 226 may output the regulated voltage as the output voltage. The buck regulator 226 may also output a regulated current as an output current. The output voltage and the output current is provided to the output terminal of the voltage converter. An error correction system 232 may receive the regulated signals, i.e., the regulated voltage and the regulated current. The error correction system 232 may transmit a correction signal to the buck regulator 226 to regulate the regulated signals in a similar manner as described above regarding FIG. 2. The error correction system 232 may regulate the regulated signals by comparing the regulated signals to programming signals and ensuring the regulated signal to programming signal ratio is within an acceptable range.

If a DC input source 203 is one of the plurality of input voltages provided by the input voltage subsystem 201, the DC input source 203 is coupled to a node 217 defined by the junction of a first capacitor 216 and a second capacitor 218. The DC input source 203 is also coupled to a center tap of the secondary winding 230 of the transformer. This secondary winding 230 of the transformer is configured as an autotransformer. In other words, the secondary winding 230 of the transformer is divided into a first autowinding 204 and a second autowinding 206. In an embodiment of the invention, the number of turns of the first autowinding 204 may be equal to the number of turns of the second autowinding 206. In an embodiment of the invention, the number of turns of the second autowinding 204 may not be equal to the number of turns of the second autowinding 206. A terminal of the first autowinding is coupled to the drain of a first switching device 208 and to an anode of a diode 214. A source of the first switching device 208 is coupled to a reference ground. A gate of the first switching device 208 is coupled to a control circuit 220. A terminal of the second autowinding 206 is coupled to the drain of the second switching device 210 and the anode of the diode 212. A drain of the second switch 210 is coupled to a node 215 defined by the junction of the terminal of the second autowinding 206 and an anode of the diode 212. A source of the second switching device 210 is coupled to ground. The gate of the second switching device 210 is coupled to the control circuit. A node 240 is defined as the junction of the cathode of the diode 214, second diode 212, and the second capacitor 218.

The control circuit 220 is driven at the same frequency as the driver of the switching device in the input system 201. The control circuit 220 drives the turning on and off of the switches 208 and 210. If the first switch 208 is conducting, i.e., turned on, then the first terminal of the autowinding 204 is coupled to ground through the first switch. In other words the first terminal of the autowinding is coupled to 0 volts. The DC input voltage is coupled to the center tap 207 of the autotransformer. Thus, the DC input voltage is impressed across the first autowinding 204. In an embodiment of the invention, the second autowinding 206 may have the same number of turns as the first autowinding 204. Thus, the voltage across the second autowinding 206 may be the same as the voltage across the first autowinding 204. In other words, the DC input voltage is impressed across the second autowinding 206. Thus, at a second terminal of the second autowinding 206, the transformed voltage is double the DC input voltage. This allows the charging of the second capacitor 218 to DC input voltage.

The operation of switch 210 is symmetrical to the operation of switch 208. In a similar fashion, when switch 210 is conducting, the second terminal of the second autowinding 206 is coupled to ground, the center tap 207 is coupled to DC input voltage, and the first terminal of the second autowinding 204 is coupled to double the DC input voltage, if the number of turns of the first autowinding 204 is the same as the number of turns of the second autowinding 206. Thus, the voltages are just reversed from when switch 208 is conducting. Thus, when switch 210 is conducting, the second capacitor 218 is also charged to DC input voltage.

The combination of the activation of the switches 208 and 210 produce a squarewave that has a peak-to-peak voltage of two multiplied by the DC input voltage and an RMS value of two multiplied by the DC input voltage. The rectifying circuit, formed by the diodes 212 and 214, rectifies the squarewave to produce a DC voltage having a magnitude of two multiplied by the DC input voltage.

Similarly, the DC voltage at the node 240 is equal to double the DC input voltage.

The DC voltage is then provided to the buck regulator 226. The operation of the buck regulator 226 is described in detail above. Similarly, the error correction system may regulate the regulated signals, i.e., the regulated voltage and the regulated current, generated by the buck regulator by maintaining the regulated signal to programming signal ratios. The operation of the error correction system is described in detail above.

Figure 4A:
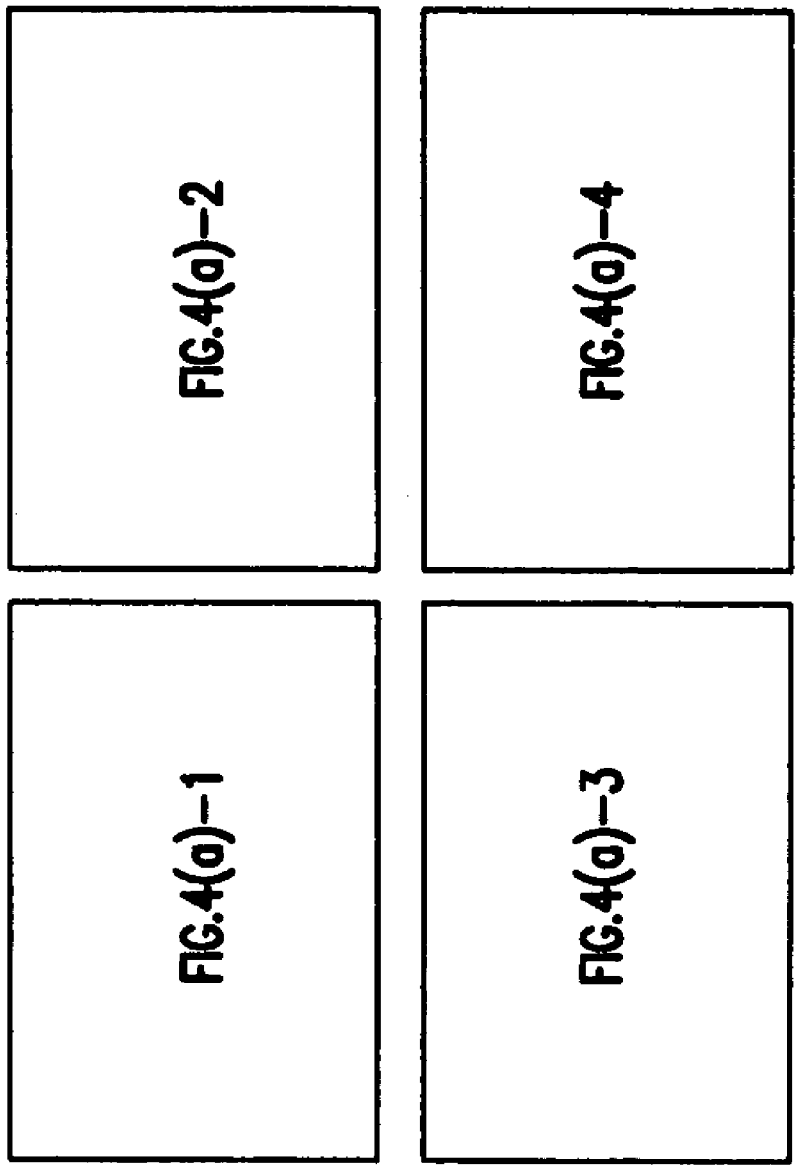
FIG. 4(a) is a schematic of a voltage input system, a common mode noise cancellation circuit, and a triac enabling multiplying circuit according to an embodiment of the invention.
Figures 1, 4A:
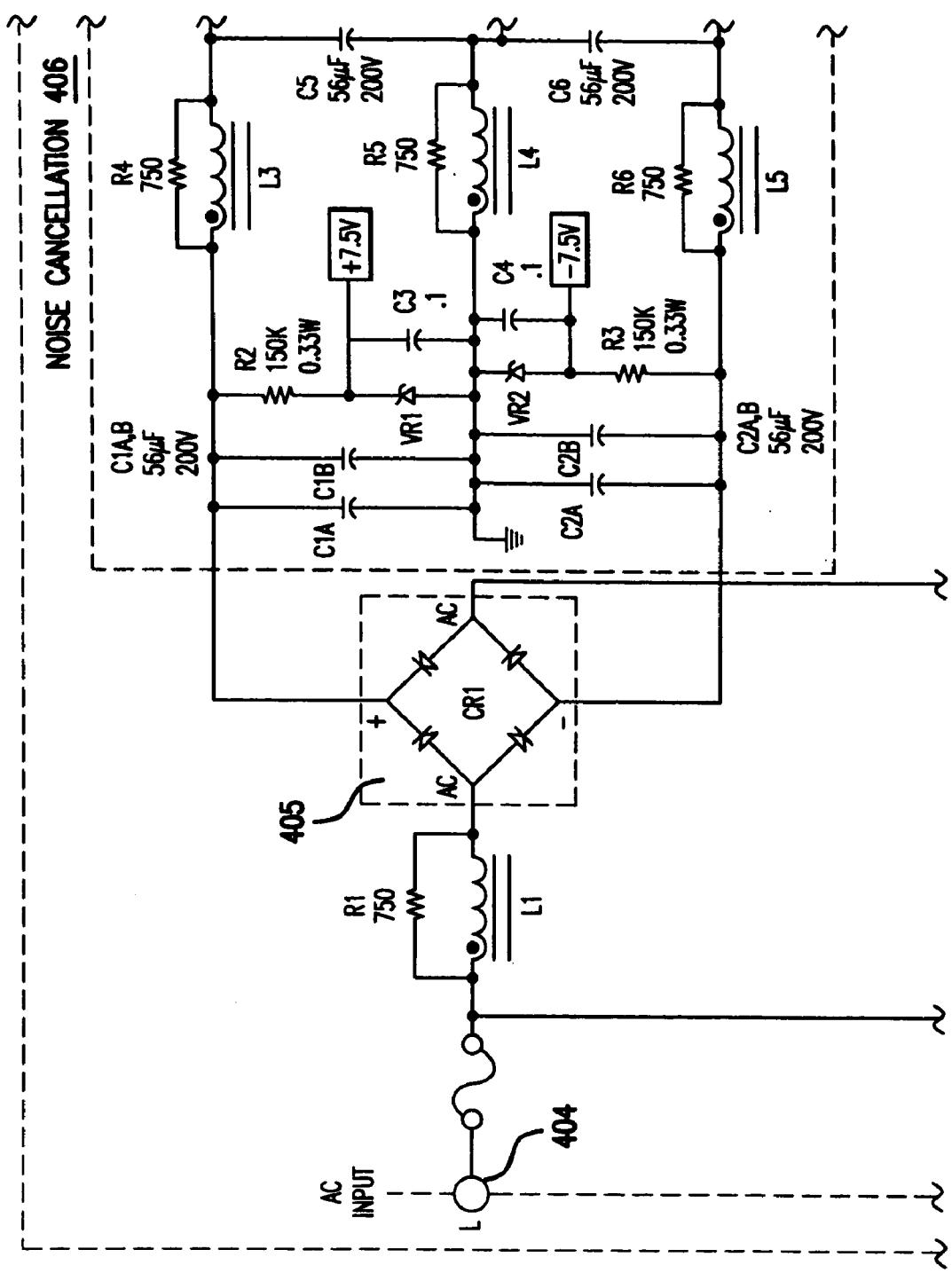
Figures 2, 4A:
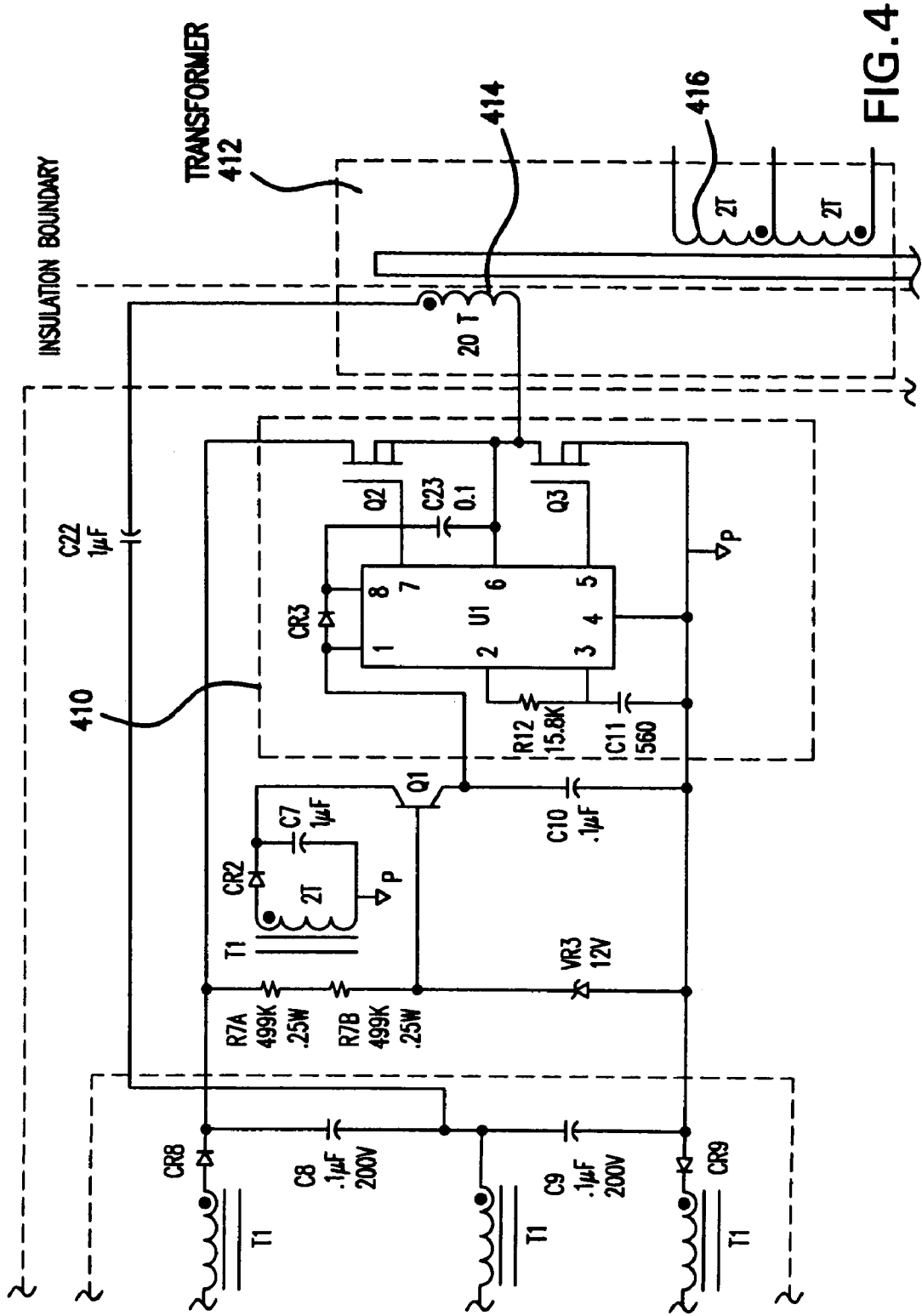
Figures 3, 4A:
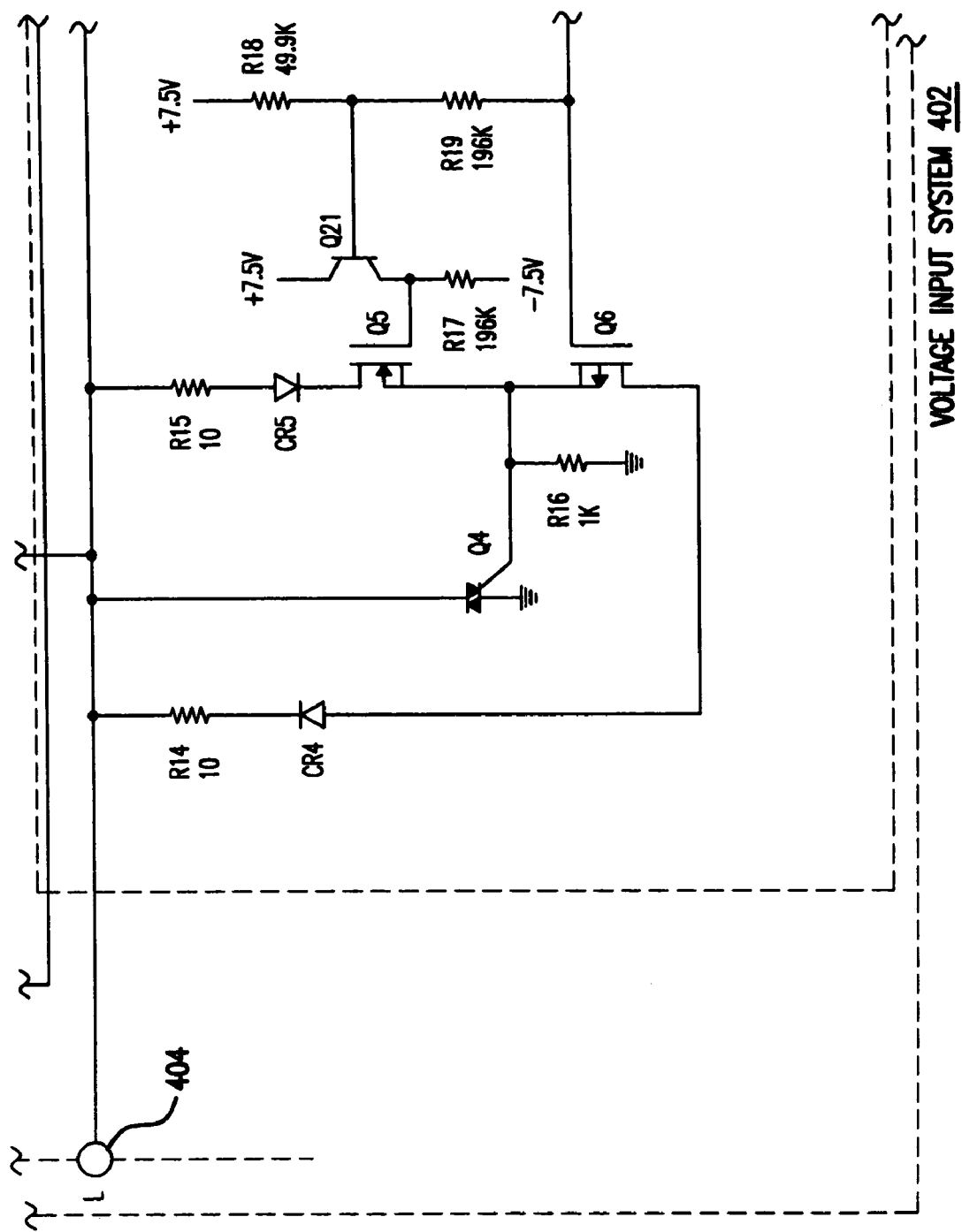
Figures 4, 4A:
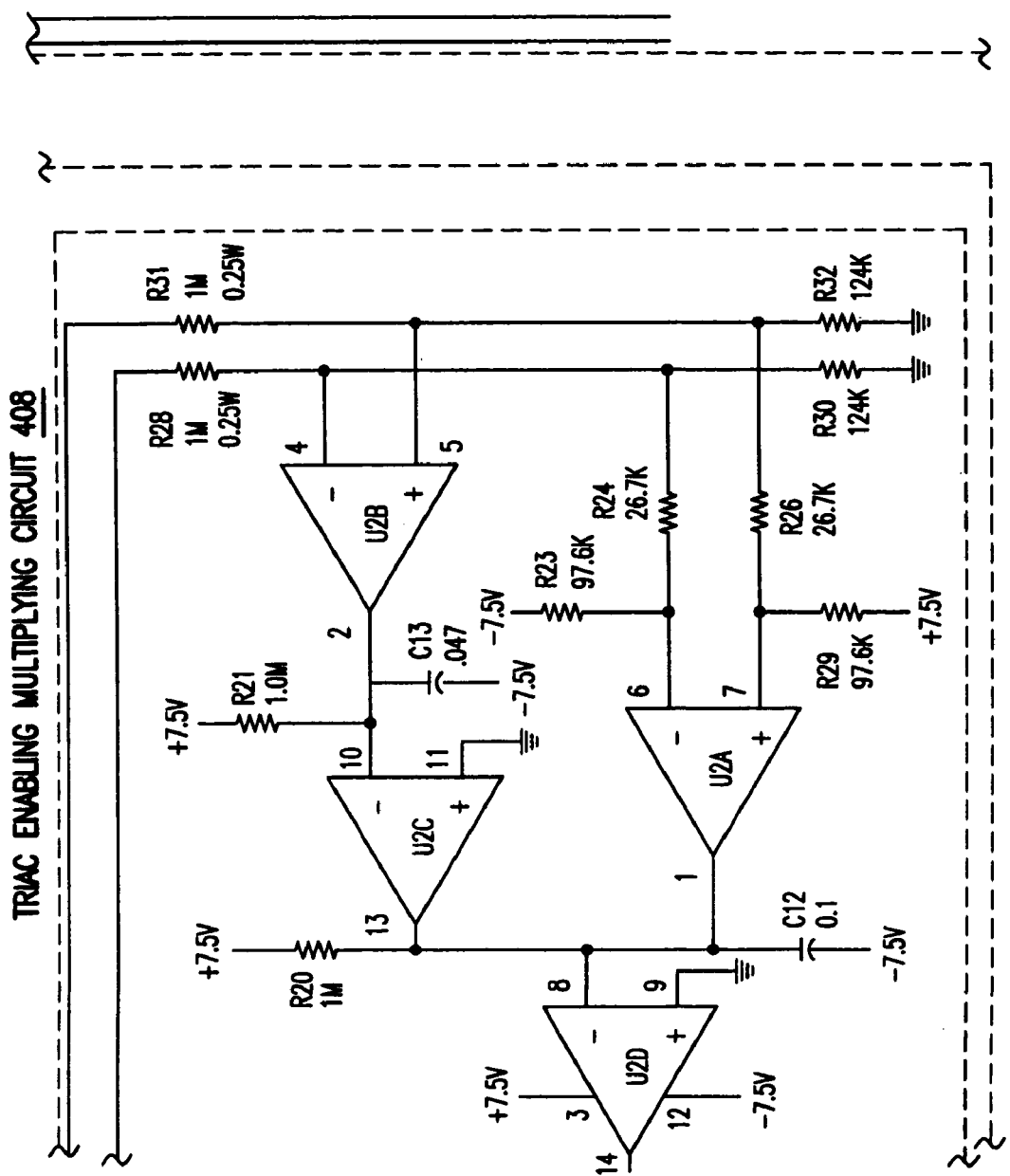

FIGS. 4(*a*), 4(*b*), 4(*c*), and 4(*d*) illustrate a schematic of the power converter with an AC input source and a DC input source according to an embodiment of the present invention. FIG. 4(a) illustrates a voltage input system including an AC input source, a noise cancellation circuit, and a triac-enabled doubling circuit according to an embodiment of the present invention. The voltage input system 402 includes an AC input source 404, a bridge rectifier 405, a noise cancellation circuit 406, a triac-enabled multiplying circuit 408, and a switching device 410. The AC input source 404 provides an AC input to the bridge rectifier 405. The bridge rectifier 405 outputs a rectified voltage. Depending on the magnitude of the AC input voltage, the rectified voltage may be multiplied by the triac-enable multiplying circuit 408 to create a multiplied voltage. The rectified voltage or the multiplied voltage may be input to the switching device 410. The switching device 410 may output a switched voltage. In an embodiment of the present invention, the switched voltage may be a squarewave. Illustratively, under certain operating conditions, the squarewave may have a peak-to-peak voltage magnitude of 300 volts and an RMS voltage magnitude of 150 volts. Common mode noise generated by the switching device 410 may be cancelled out by a common mode cancellation waveform generated by the noise cancellation circuit 406. The noise cancellation circuit 406 and the triac-enabled multiplying circuit 408 are discussed in co-pending patent application entitled, "Common Mode Noise Cancellation Circuit," U.S. application Ser. No. 10/452,162, filed May 30, 2003, which is incorporated by reference.

Figures 1, 4B:
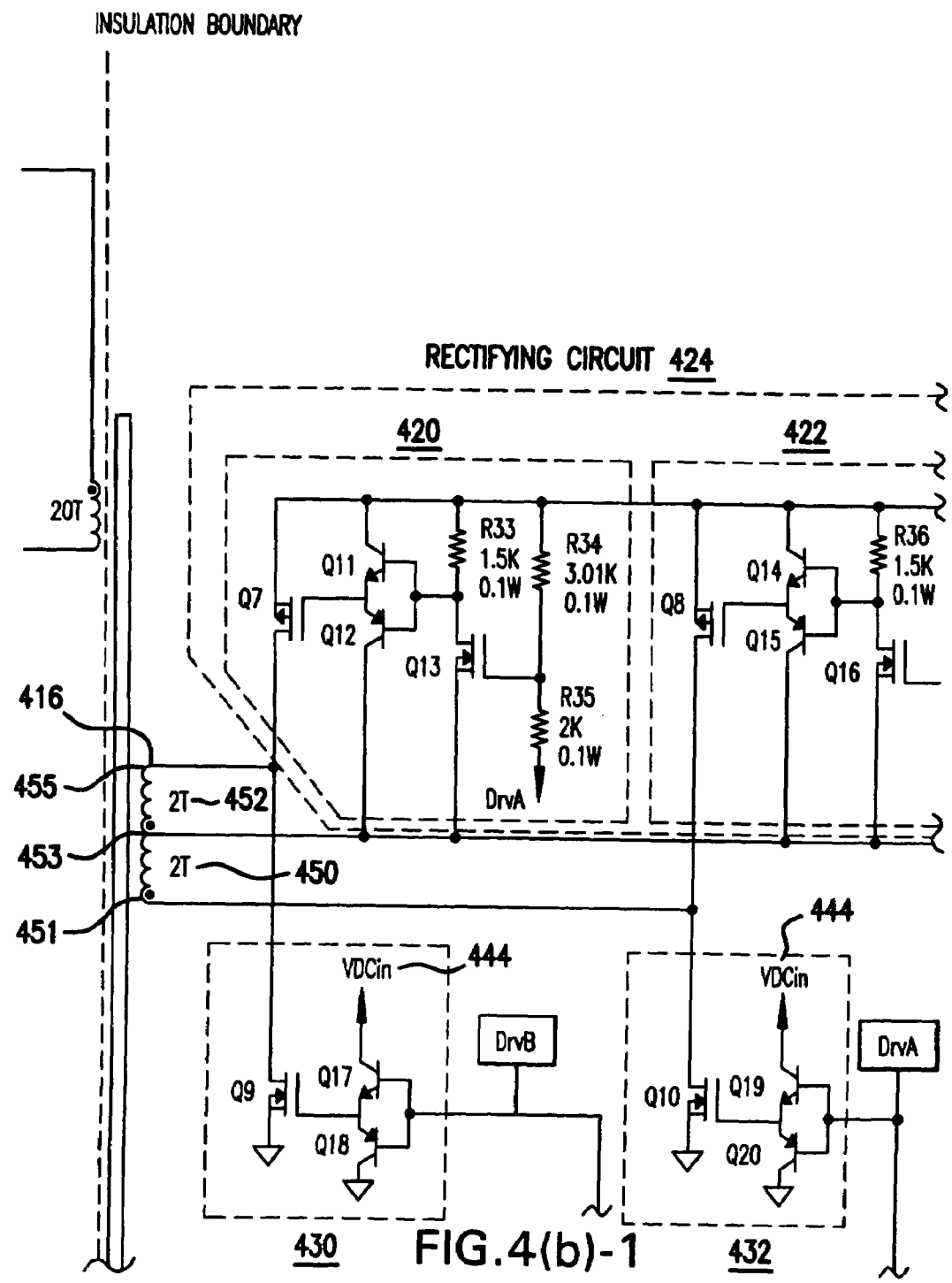
FIG. 4(b) is a schematic of a transformer, switching devices, a control circuit, and a rectifying circuit according to an embodiment of the invention.
Figures 2, 4B:
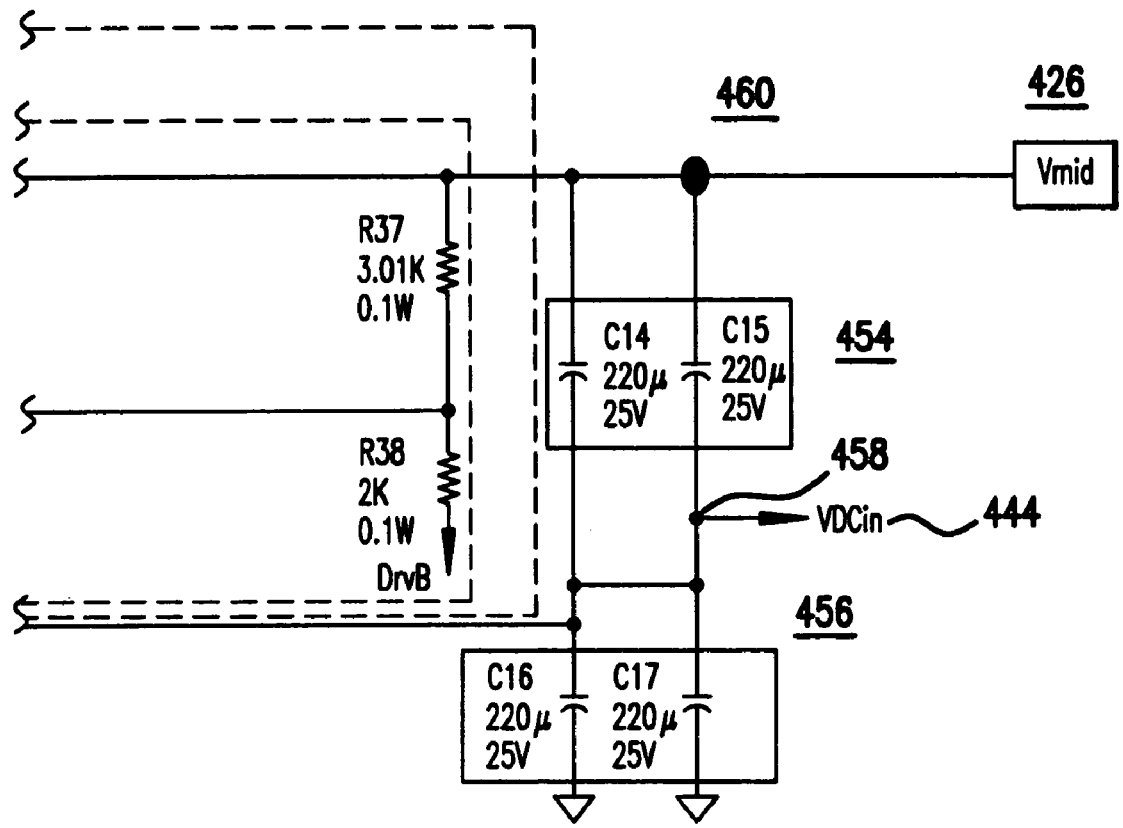
Figures 3, 4B:
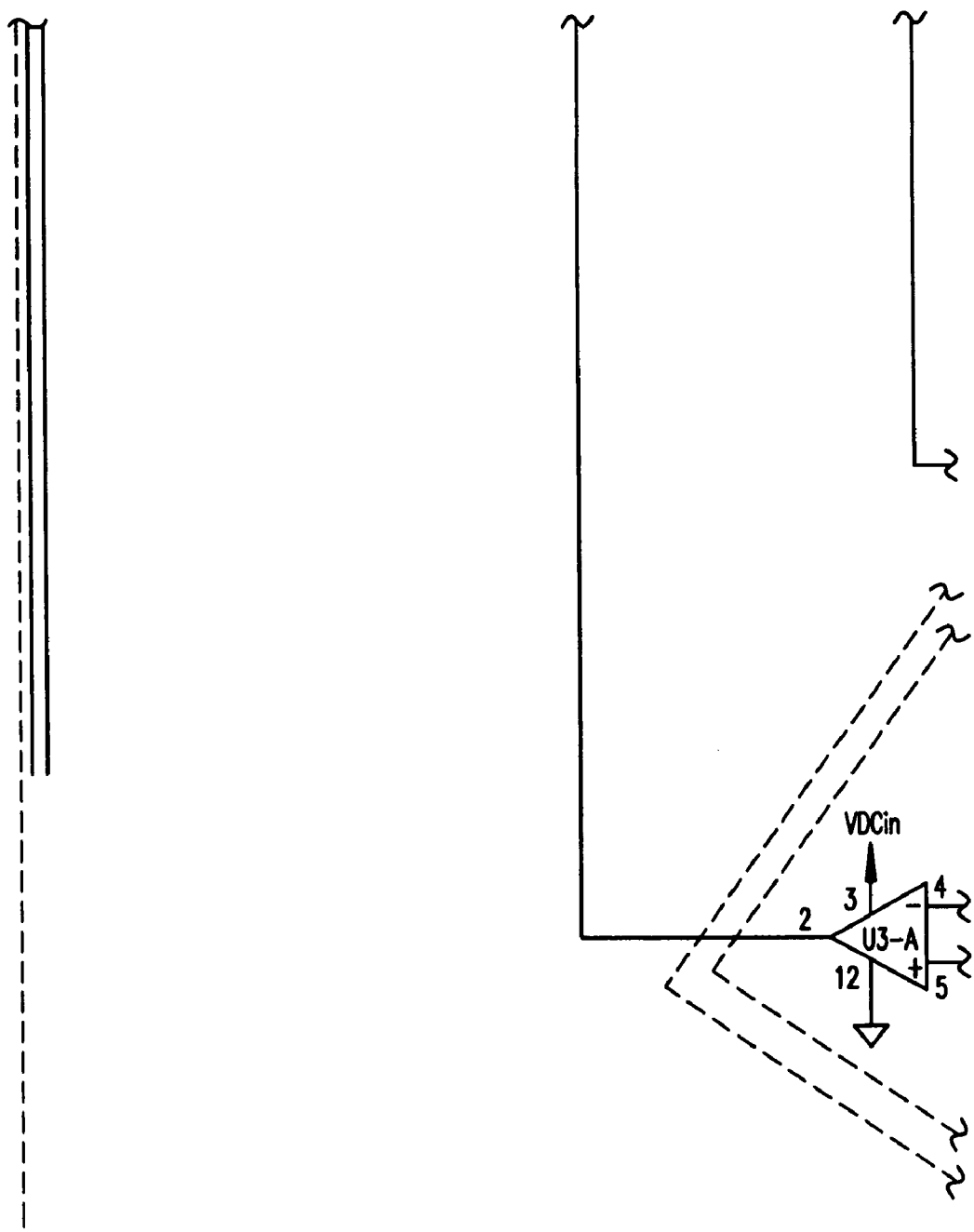
Figures 4, 4B:
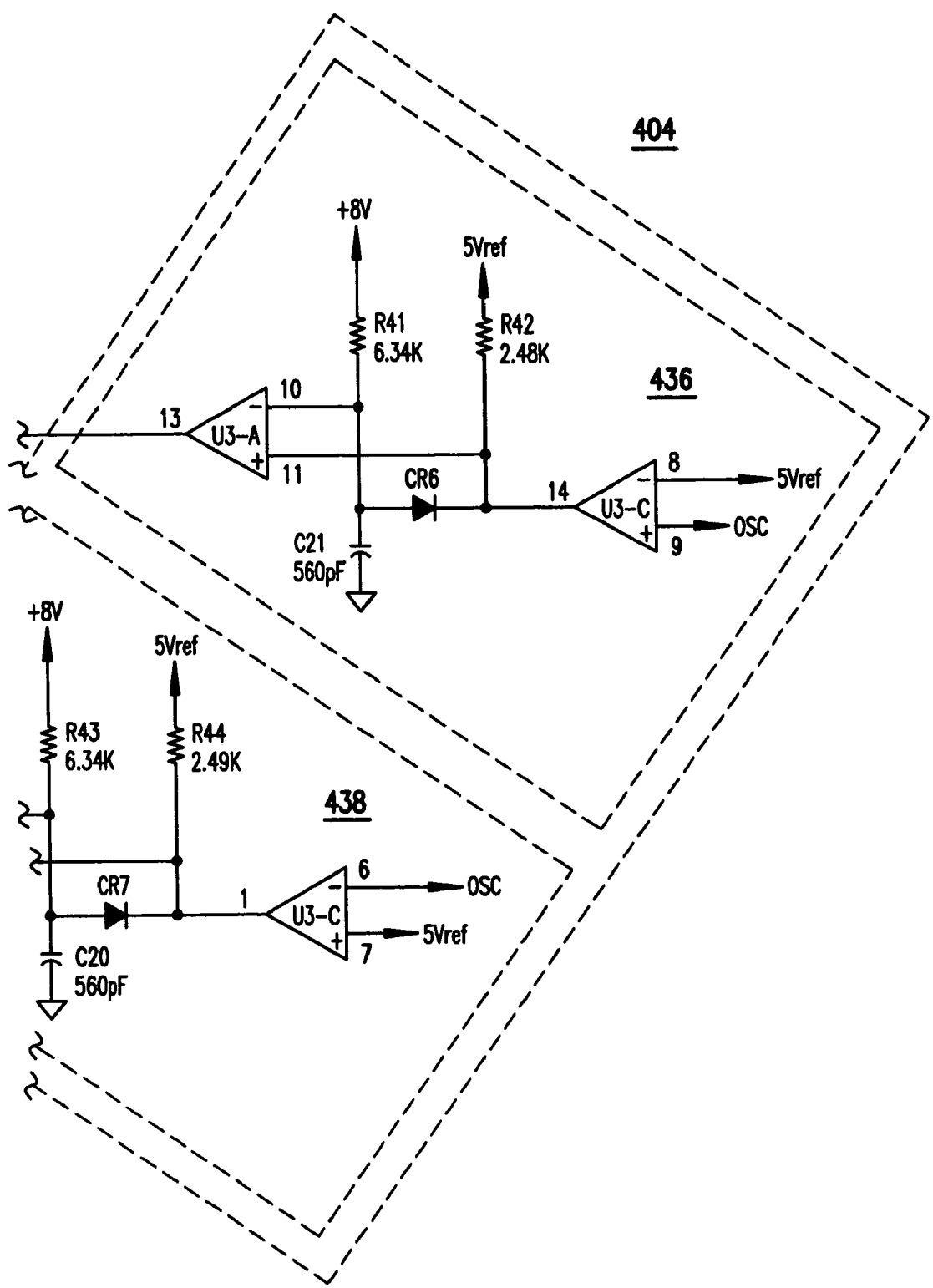

The switched voltage may be output to the transformer 412, which includes a primary winding 414 and a secondary winding 416 (see FIG. 4(b)). The transformer 412 may receive the switched voltage and may output an intermediate voltage across the entire secondary winding 416. The magnitude of the intermediate voltage across the secondary winding 416 may be determined by multiplying a magnitude of the switched voltage times the secondary-to-primary turns ratio. In other words, the number of turns of the secondary winding 416 divided by the number of turns of the primary winding 414 (see FIG. 4(a)) is then multiplied by the magnitude of the switched voltage to determine the magnitude of the intermediate voltage. Illustratively, as shown in FIG. 4(a), the number of turns of the primary winding 414 is 20 and the number of turns of the secondary winding 416 is 4, which equals 1/5, i.e., 4/20. If the magnitude of the switched voltage is 150 volts RMS, then in this illustrated embodiment, the magnitude of the intermediate voltage is 30 volts RMS.

FIG. 4(b) illustrates the rectifying circuit and the switching devices of the power converter according to an embodiment of the present invention. The intermediate voltage is input to a rectifying circuit 424. The rectifying circuit 424 may include switching devices 420 and 422. Switching devices 420 and 422 perform rectification on the intermediate/transformed voltage and output a DC voltage to $V_{mid}$ 426. In an embodiment of the invention illustrated in FIG. 4(b), if the transformed voltage is a squarewave and has a magnitude of 30 volts RMS, the DC voltage after rectification by the rectifying circuit 424 may be 30 volts DC.

The control circuit 434 transmits driving signals, labeled DrvA and DrvB, to the switching devices 420 and 422, respectively. The driving signals DrvA and DrvB are generated by control subcircuits 436 and 438, respectively. Control subcircuit 436 compares an oscillating signal, labeled OSC, with a reference voltage, e.g., 5 volts, to generate the driving signal DrvA. Similarly, control subcircuit 438 compares an oscillating signal, labeled OSC, with a reference voltage to generate signal DrvB. The driving signals DrvA and DrvB are never active, e.g., they are high at the same time because the inputs for the control subcircuit 438 are opposite to the input for the control subcircuit 436. In other words, in control subcircuit 438, the reference voltage is input into the inverting input and the oscillating signal is input into the non-inverting input. In control subcircuit 436, the reference voltage is input into the non-inverting input and the oscillating signal is input into the inverting input. The generation of the oscillating signal is discussed below. In an embodiment of the invention, the duty cycle of driving signals DrvB and DrvA is 50%.

Figure 4C:
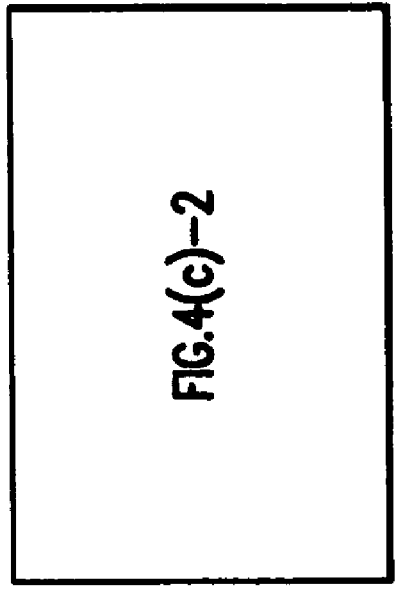
FIG. 4(c) is a schematic of voltage reference circuits, a buck regulator, and a waveform generator according to an embodiment of the invention.
Figure 4C:
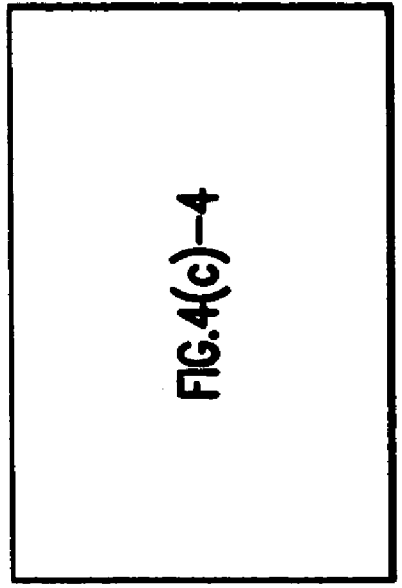
Figure 4C:
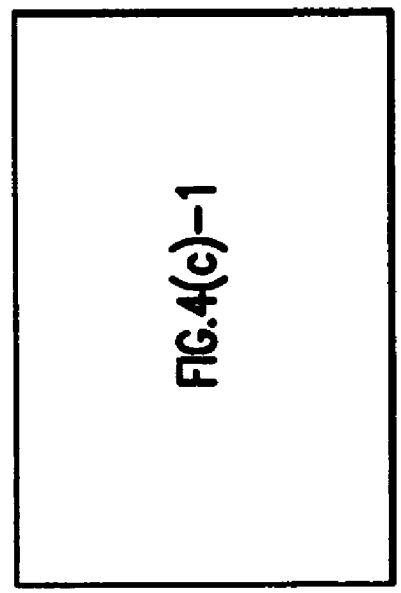
Figure 4C:
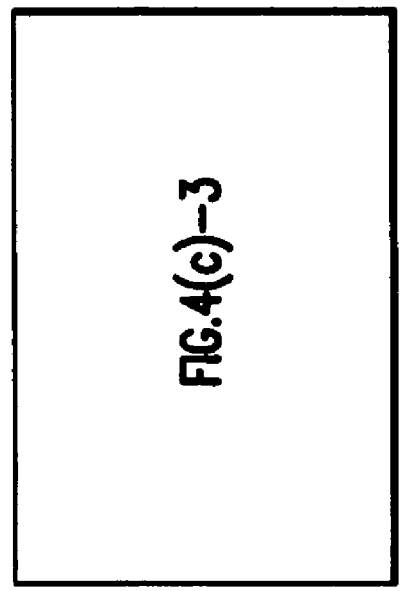
Figures 1, 4C:
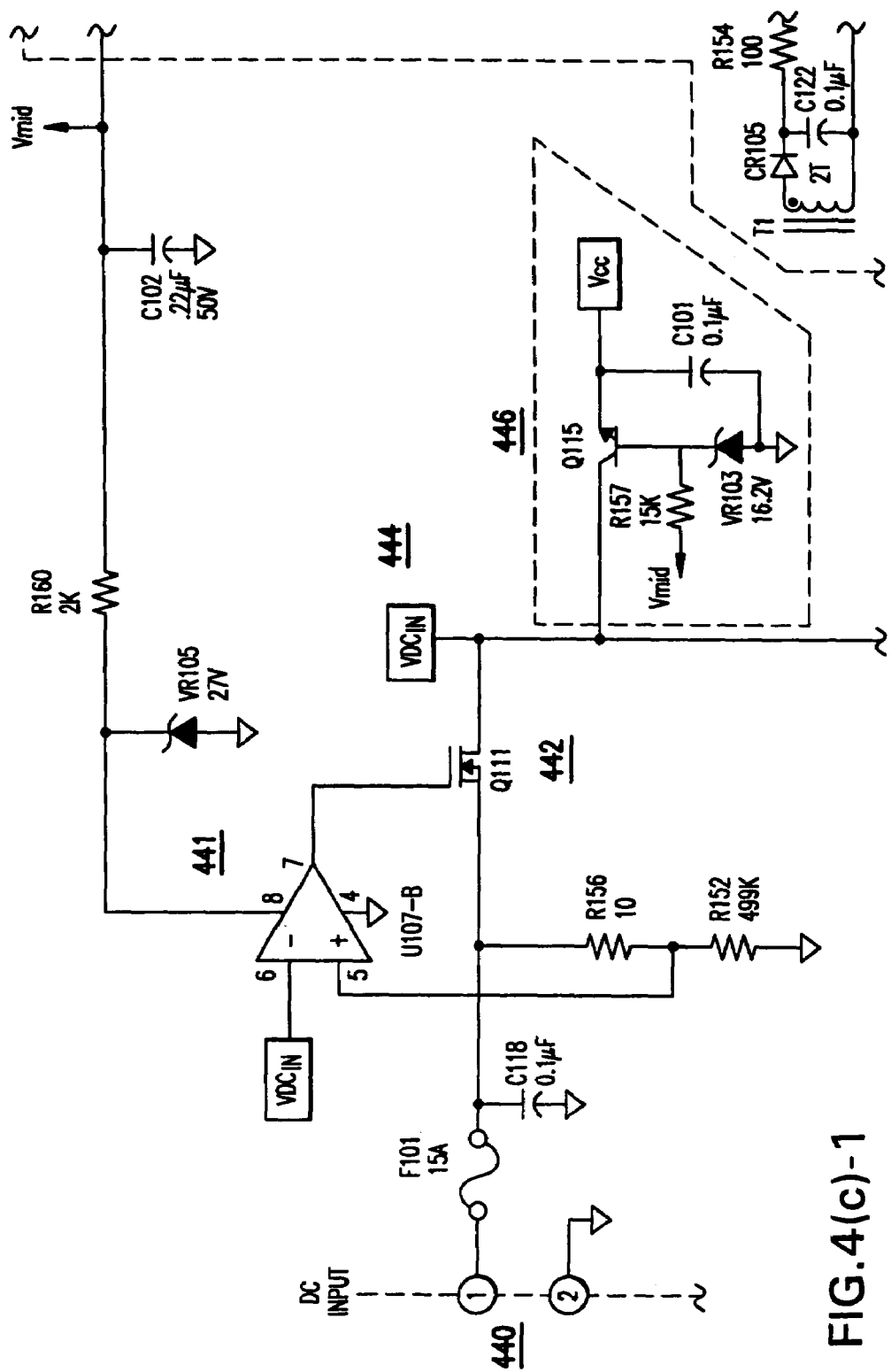
Figures 2, 4C:
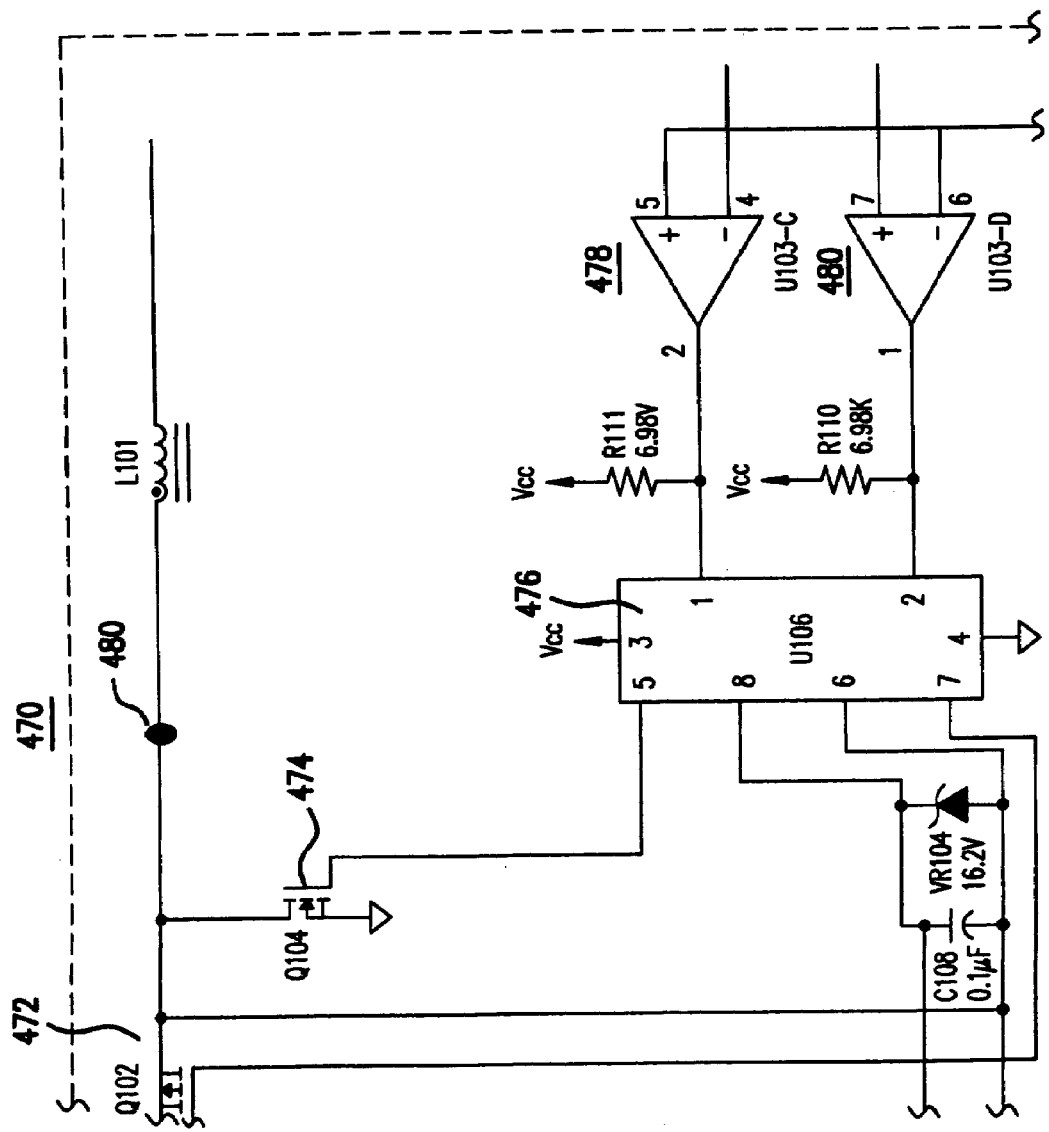
Figures 3, 4C:
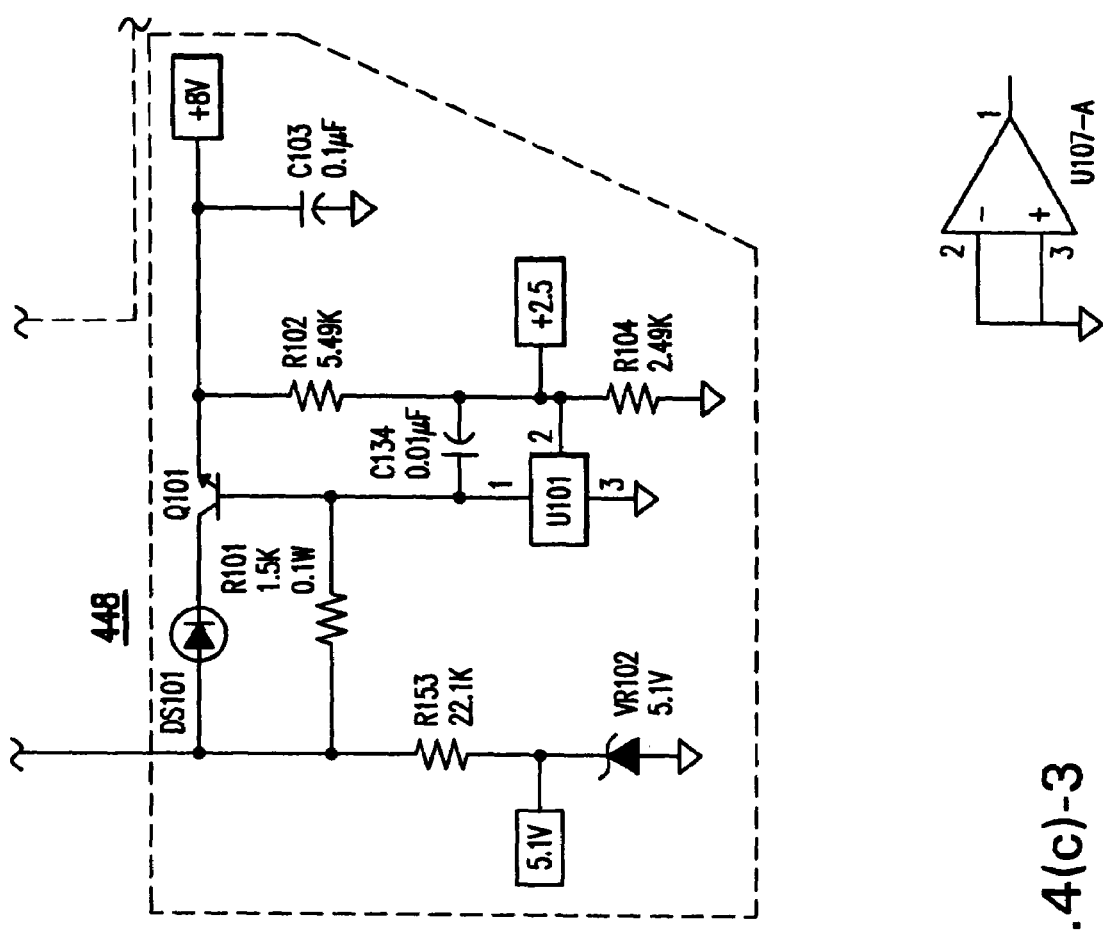
Figures 4, 4C:
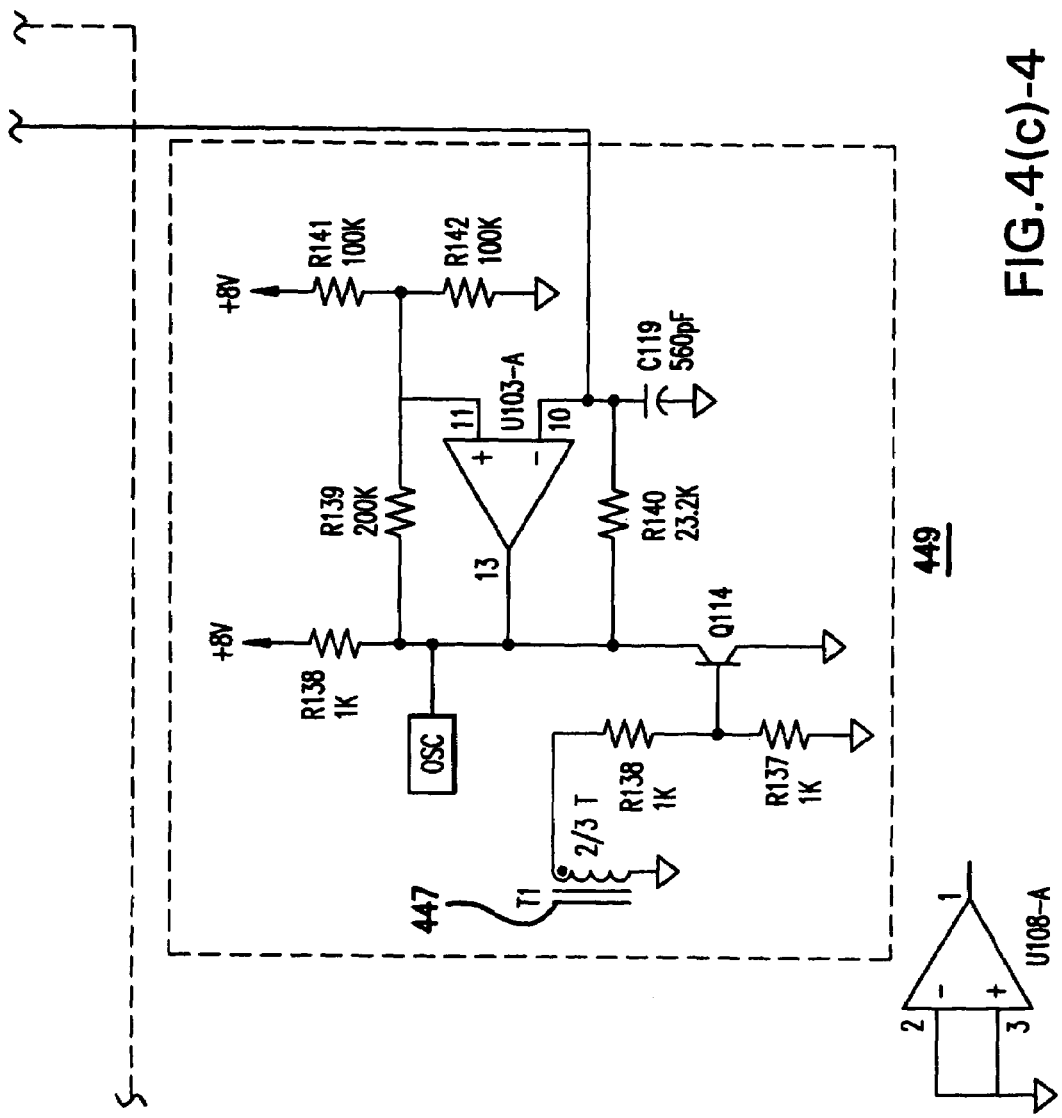

FIG. 4(c) illustrates a voltage input system including a DC input source and a buck regulator according to an embodiment of the present invention. A DC voltage is input via terminals 1 and 2 440. Comparator U107-B 441 senses that DC voltage is present within the device. Q111 442 is a blocking device that prevents current from traveling towards the DC input source 440. The DC input voltage from the DC input source 440 is represented by $VDC_{in}$ 444 in FIG. 4(c).

First reference voltage circuit 446 generates the reference voltage $V_{cc}$ which is utilized in other parts of the power converter. The first reference voltage circuit 446 is coupled to $VDC_{in}$ 444. In an embodiment of the invention, the first reference voltage circuit 446 may limit $V_{cc}$ to a maximum of 16.2 volts. The limiting of the $V_{cc}$ is necessary since integrated circuits utilized in the power converter prefer not to receive input voltages greater than 20 volts.

Second reference voltage circuit 448 generates a plurality of reference voltages for use in other parts of the power converter. For example, in the embodiment of the invention illustrated in FIG. 4(c), a reference voltage of 5.1 volts, a reference voltage of 2.5 volts, and a reference voltage of +5 volts are provided by the second reference voltage circuit 448. The second reference voltage circuit 448 is also coupled to $VDC_{in}$ 444.

Referring back to FIG. 4(b), $VDC_{in}$ 444 is coupled to a terminal of a transistor in switching device 430. $VDC_{in}$ 444 is also coupled to a terminal of a transistor in switching device 432. $VDC_{in}$ 444 is also coupled to the center node 458 of a capacitor bank. The capacitor bank is formed by the pair of capacitors 454 and the pair of capacitors 456. Switching device 430 and switching device 432 are driven by control circuit 434. In the embodiment of the invention illustrated in FIG. 4(b), first control subcircuit 438 drives switching device 430 via the drive signal DrvB and second control subcircuit 436 drives switching device 432 via the drive signal DrvA. In an embodiment of the invention, a duty cycle of drive signal DrvB is 50% and a duty cycle of drive signal DrvA is 50%. Because switching device 420 and switching device 432 utilize drive signal DrvA, both switching devices 420 and 432 may be turned on at the same time. Similarly, because switching device 422 and switching device 430 both utilize drive signal DrvB, both of switching devices 422 and 430 may be turned on at the same time.

Switching device 430 corresponds to switching device 208 in FIG. 3 and switching device 432 corresponds to switching device 210 in FIG. 3. Switching device 420 corresponds to diode 214 in FIG. 3 and switching device 422 corresponds to diode 212 in FIG. 3. The operation of the autotransformer, the control circuit 434, the switching devices 430 and 432, and the rectifying circuit 424 is similar to the operation described above regarding FIG. 3. The secondary winding 416 of the transformer is configured as an autotransformer. In other words, the secondary winding 416 of the transformer 414 has a first autowinding 450 and a second autowinding 452. In the embodiment of the invention illustrated in FIG. 4(b), the first autowinding 450 and the second autowinding 452 have an equivalent number of turns. In an embodiment of the present invention, the first autowinding 450 and the second autowinding 452 may not have an equivalent number of turns.

The drain of the switching device 430 is coupled to a terminal 451 of the first autowinding 450. The drain of the switching device 432 is coupled to node 460. $VDC_{in}$ 444 is coupled to the center of the capacitor bank, e.g., 458. Node 458 is formed by the junction of the positive terminals of the pair of capacitors C16 and C17 456 and the negative terminals of the pair of capacitors C14 and C15 454.

As the first control subcircuit 438 drives the first switching device 430 on, terminal 451 of the first autowinding 450 is coupled to ground. $VDC_{in}$ 444 is coupled to the center tap 453. The coupling of $VDC_{in}$ to the center tap 453 places $VDC_{in}$ across the first autowinding 450 for the timeframe of the first switching device is closed on. Because the first autowinding 450 and the second autowinding 452 are an autotransformer, the voltage across the first autowinding 450 is also placed across the second autowinding 452, subject to reduction, staying the same, or increasing due to the first autowinding to the second autowinding turns ratio. In the embodiment of the invention illustrated in FIG. 4(b), the number of turns of the first autowinding 450 is equal to the number of turns of the second autowinding 452. Thus, $VDC_{in}$ 444 may be placed across the second autowinding 452. Thus, a transformed voltage having a magnitude of $2 \times VDC_{in}$ is placed across the entire secondary winding in the timeframe that the switching device 430 is on.

As discussed above, as the second control subcircuit 436 drives switching device 432, a similar process occurs. Terminal 455 of the second autowinding is coupled to ground, the center tap 453 is still coupled to $VDC_{in}$, and terminal 451 is coupled to $2 \times VDC_{in}$. Thus, a voltage having a magnitude $2 \times VDC_{in}$ is placed across the entire secondary winding 416. Thus, a transformed voltage having a magnitude of $2 \times VDC_{in}$ is placed across the entire secondary winding in the timeframe the switching device 432 is on.

Accordingly, in the embodiment of the invention illustrated in FIG. 4(b), the transformed voltage takes the form of a squarewave having a peak-to-peak voltage of $2 \times VDC_{in}$ and a RMS voltage of $2 \times VDC_{in}$.

The rectifying circuit 424 may receive the transformed waveform and rectify the transformed waveform. Switching devices 420 and 422 may rectify the transformed voltage. In the embodiment of the invention illustrated in FIG. 4(b), the transformed voltage has a magnitude of $2 \times VDC_{in}$ RMS. In the embodiment illustrated in FIG. 4(b), the transformed voltage is a squarewave. The rectification of a squarewave produces a DC value that is the same as the value of the RMS voltage. Thus, in the embodiment of the invention illustrated in FIG. 4(b), the rectified voltage has a magnitude of $2 \times VDC_{in}$ which is supplied to $V_{mid}$ 426. Thus, $2 \times VDC_{in}$ is present at node 460 and at $V_{mid}$ 426.

The driving signals output by the control circuit 434 are created by a first control subcircuit 438, driving signal DrvA, and a second control subcircuit 436, driving signal DrvB. The first control subcircuit 438 compares an oscillating waveform generated by a waveform generator 449 (see FIG. 4(c)) to a reference voltage, e.g., 5 volts, and outputs DrvB to the switching device 430 and the switching device 422. This means that the first switching device 430 and the switching device 422 are turned on at the same time. Illustratively, DrvB may be a squarewave. Similarly, the second control subcircuit 436 compares the oscillating waveform generated by the waveform generator to a reference voltage, e.g., 5 volts and outputs a DrvA to the switching device 432 and the switching device 420. Illustratively, DrvA may be a squarewave. The second driving signal may be opposite in phase to the first driving signal because the inputs to the comparator U3-C pins 8 and 9 in the second control subcircuit 436 are opposite to the inputs to the comparator U3-C pins 6 and 7 in the first control subcircuit 438. In other words, DrvB may not activate switching devices 430 and 422 at the same time as DrA activates switching devices 432 and 420.

FIG. 4(c) illustrates the waveform generator and the buck regulator according to an embodiment of the present invention. The voltage at $V_{mid}$ 426 (see FIG. 4(b)) is input to the buck regulator 470. The buck regulator 470 includes a first switch Q102 472, e.g., a pass switch, a second switch Q104 474, e.g., a shunt switch, a driving device U106 476, a first comparator U103-C 478, and a second comparator U103-D 480. When the buck regulator 470 turns on the first switch Q102 472, the DC voltage at $V_{mid}$ is passed through to node 480. When the buck regulator turns on the second switch Q102 474, the DC voltage at Vmid does not pass through and is instead shunted to ground. The voltage present at node 480 is a regulated output voltage. The voltage at node 480 is passed through to the output terminal 2 490 (see FIG. 4(d)). A regulated current is also transferred to output terminal 2 490.

Figure 4D:
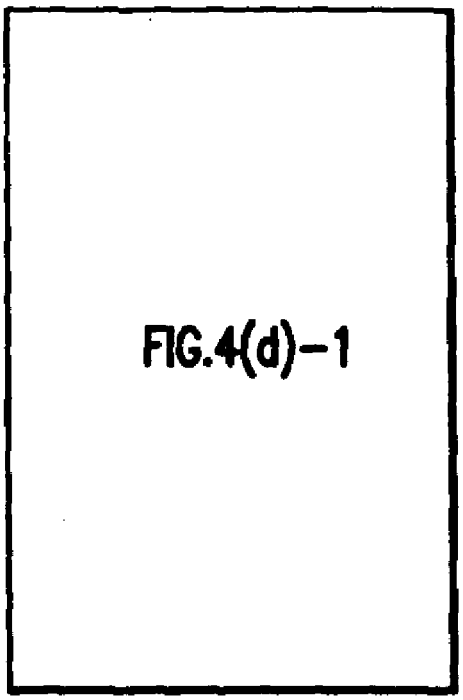
FIG. 4(d) is a schematic of an error correction circuit according to an embodiment of the invention.
Figure 4D:
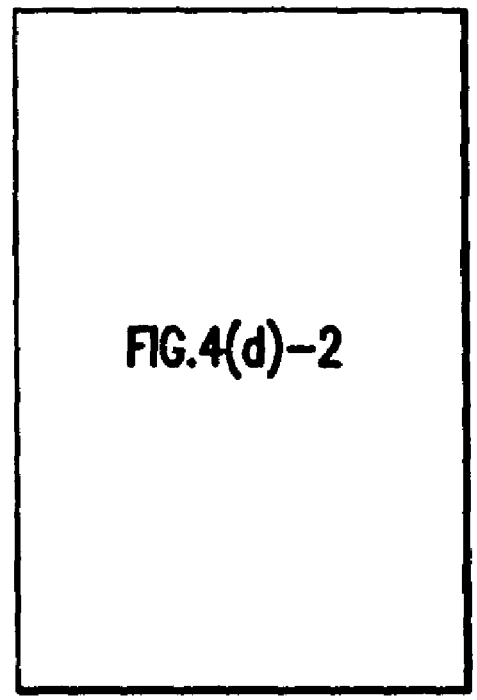
Figure 4D:
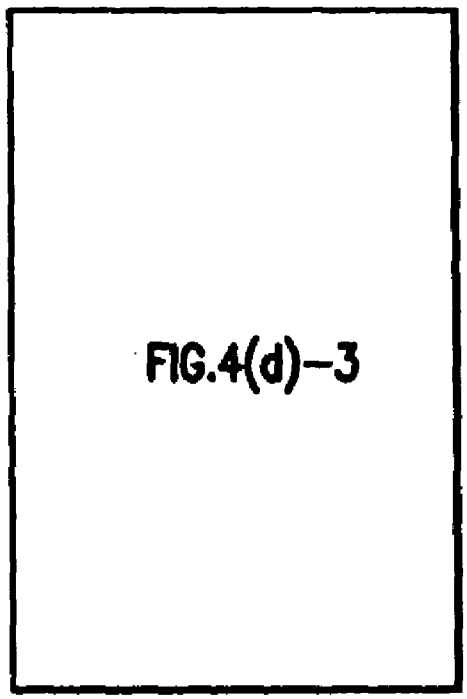
Figure 4D:
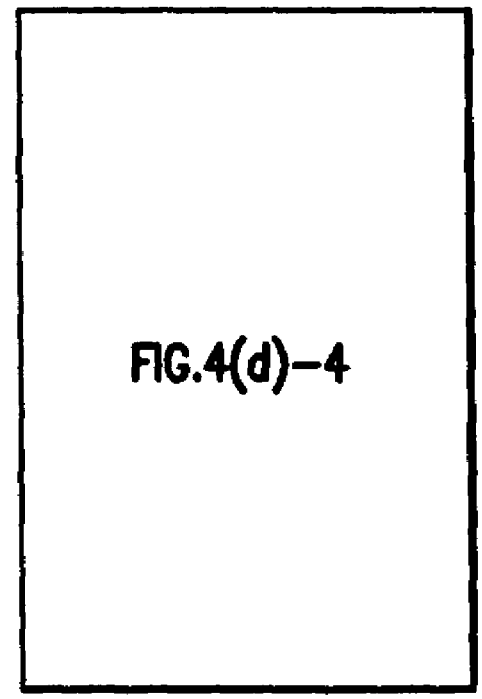
Figures 1, 4D:
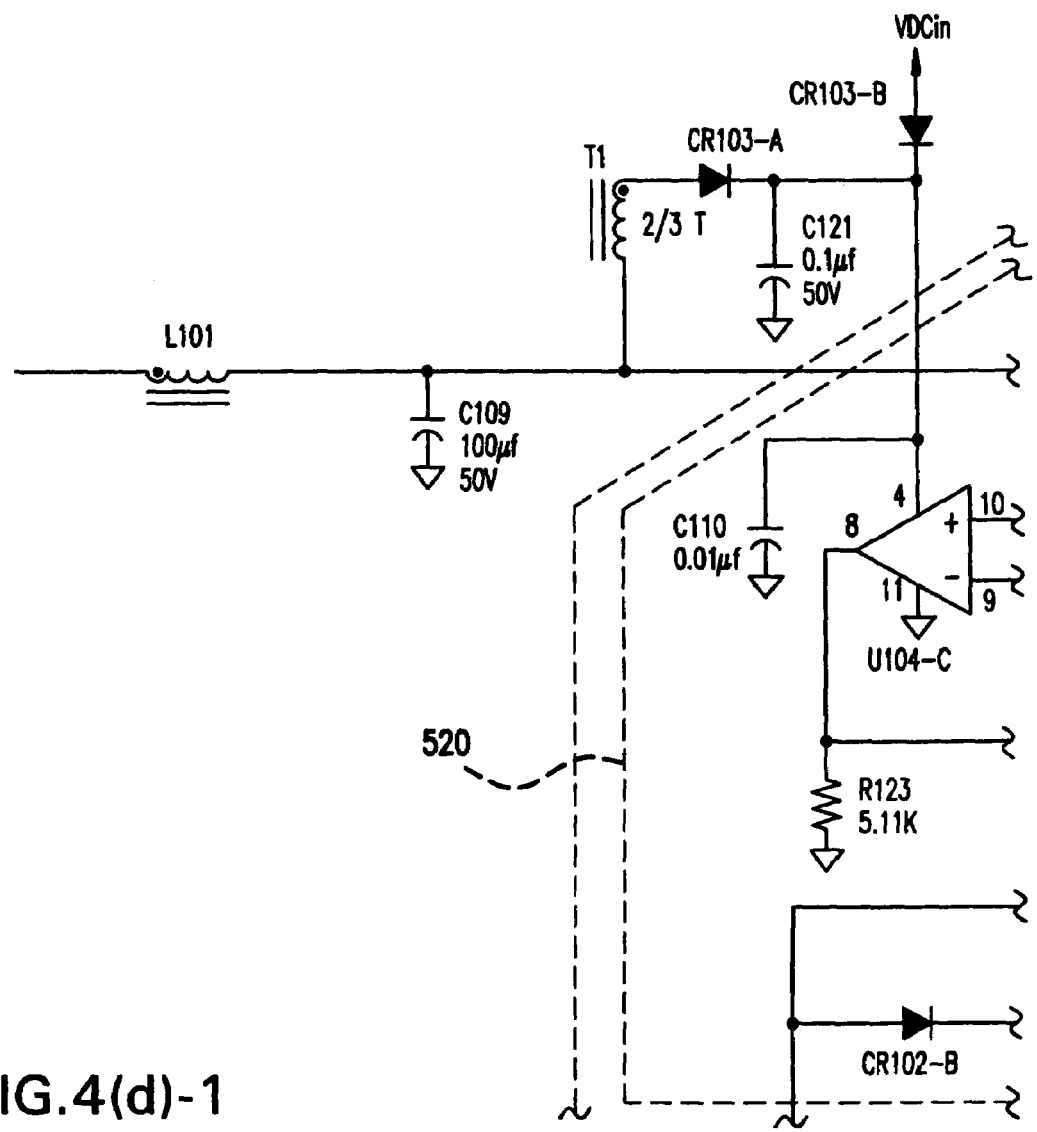
Figures 2, 4D:
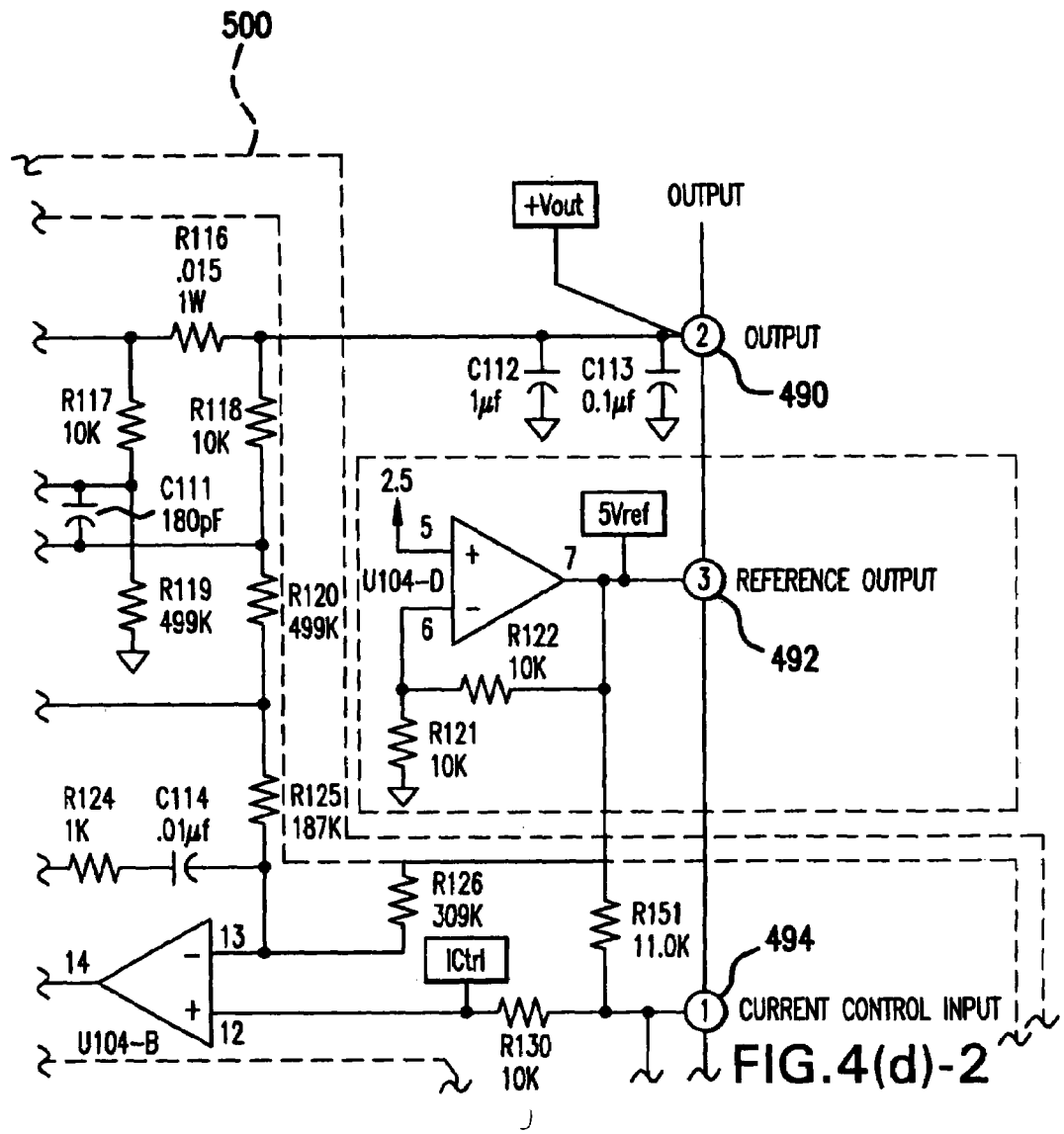
Figures 3, 4D:
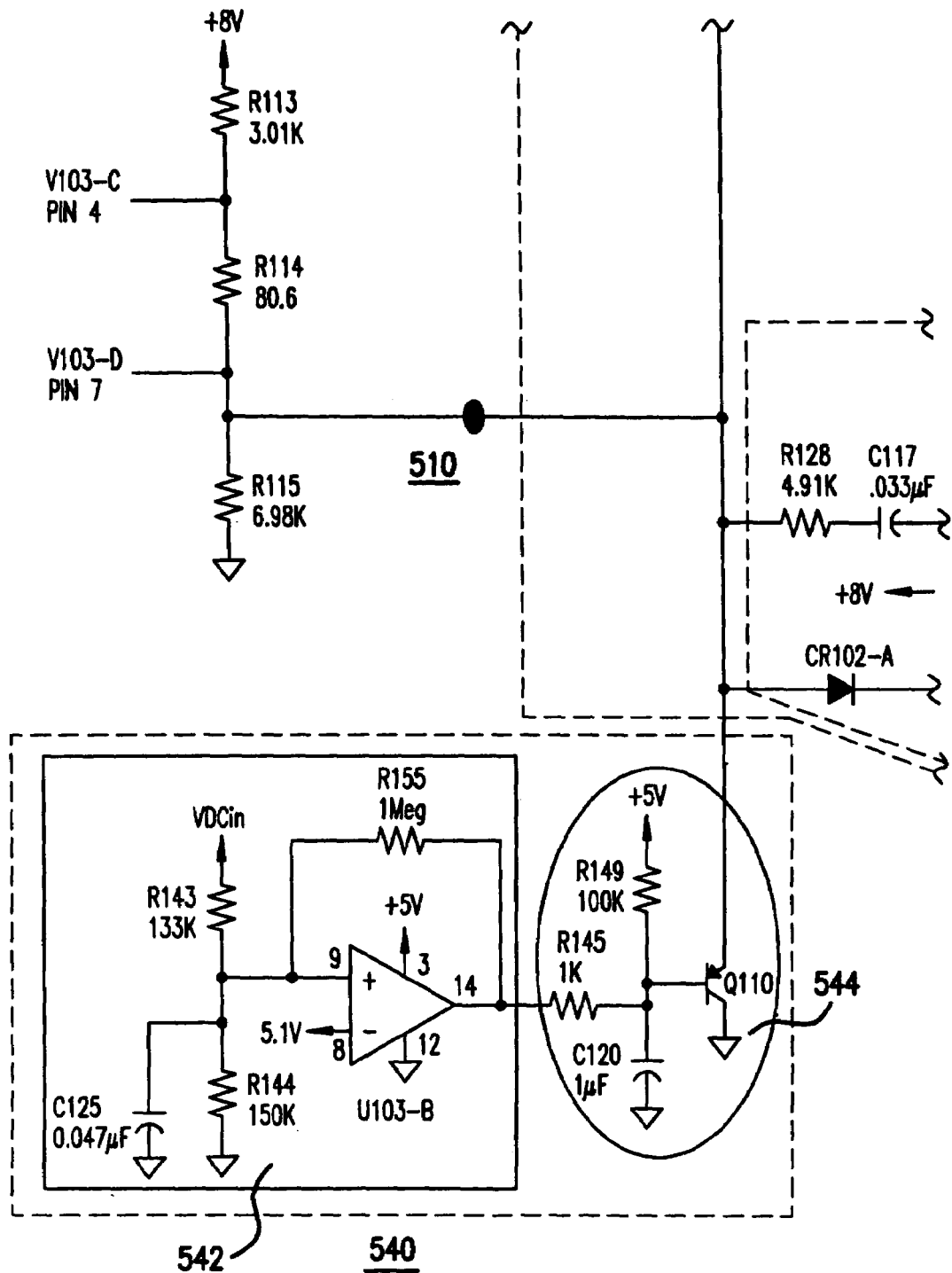
Figure 4D:
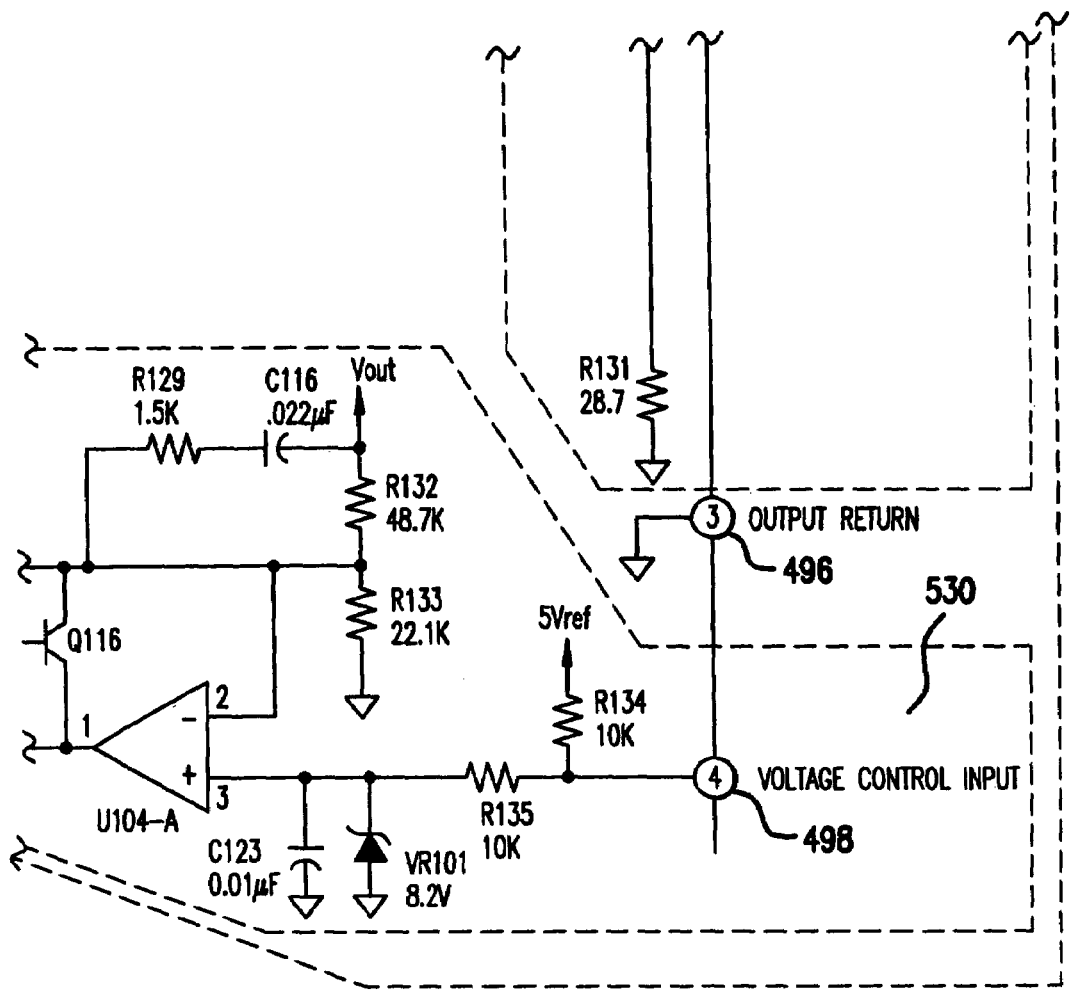
Figure 4:
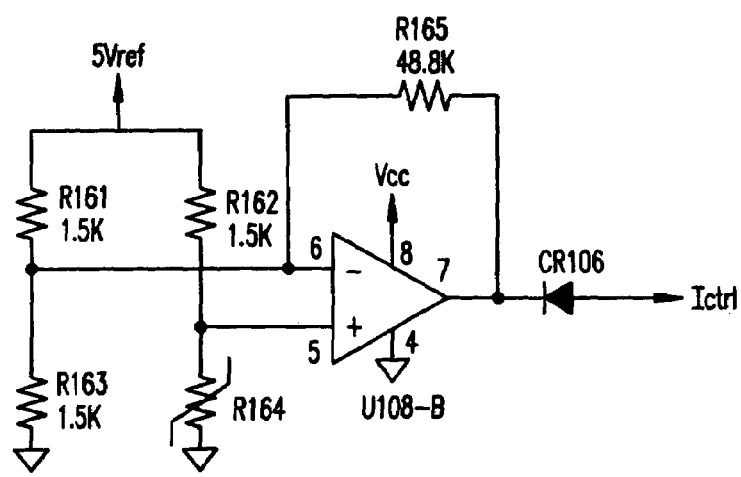

FIG. 4(d) illustrates an error correction system in a power converter schematic according to an embodiment of the present invention. The buck regulator 470 (see FIG. 4(c)) may receive a correction signal from the error correction system 500. The error correction system 500 may output a correction signal if a regulated signal to programming signal ratio is not within an acceptable range. The error correction signal is output at node 510. Illustratively, the error correction signal may be a voltage correction signal. The error correction signal may also be a current correction signal.

Node 510 is coupled to the non-inverting inputs of the comparator U103-C and U103-D. Thus, the correction signal is input to the non-inverting inputs of the comparators U103-C and U103-D. The waveform generator 449 (see FIG. 4(c)) also inputs an oscillating waveform into the inverting terminals of the comparators U103-C 478 and U103-D 480 (see FIG. 4(c)). The comparators U103-C 478 and U103-D 480 compare the oscillating waveform to the correction signal and output a pass switch driving signal and a shunt switch driving signal based on the comparison. The comparators U103-C 478 and U103-D 480 input a pass switch driving signal and a shunt switch driving signal to the driving device 476 (see FIG. 4(c)). The driving device U106 476 transmits a pass switch signal to the pass switch 472 (see FIG. 4(c)) and a shunt switch driving signal to the shunt switch 474 (see FIG. 4(c)). The pass switch signal and the shunt switch signal may never be active at the same time. The resistors R113, R114, and R115 (see FIG. 4(d)) are utilized to place a delay in between the turning on of the pass switch 472 and the turning on of the shunt switch 474.

If no voltage regulation is required, meaning the error correction signal is not active or the correction signal is not transmitted from the error correction system 500, the duty cycle of the pass switch 472 (see FIG. 4(c)) may be maintained at its current level. Maintaining the duty cycle of the pass switch 472 results in the regulated voltage and the output voltage maintaining existing values. If a correction signal is output from the error correction system 500 and it is a voltage correction signal, the duty cycle of the pass switch 472 may be increased or decreased. Illustratively, if the duty cycle of the pass switch 472 is increased, then the regulated voltage and output voltage may be increased.

Alternatively, if the duty cycle of the pass switch 472 is decreased, then the output voltage may be decreased.

If an error correction signal is output from the error correction system 500 and it is a current correction signal, the duty cycle of the pass switch 472 (see FIG. 4(c)) may be decreased in order to lower the output voltage and hence the regulated current.

The current correction subsystem 520 may generate a current correction signal. A programming current signal may be input to pin 12 of U104-B. The magnitude of the programming current is dependent upon the value of a resistor, which may be located in a cable or a connector coupled to the power converter. A reference current may be input to pin 13 of U104-B. The reference current may be generated by utilizing a voltage to current converter such as U104-C and the associated circuitry. The reference current input to U104-C has a linear relationship to the regulated current, i.e., the output current. If the ratio of the reference current to programming current is not within an acceptable range, the current correction subsystem 520 generates a current correction signal to node 510. Also, because the reference current has a linear relationship to the regulated current, it follows that the ratio of the regulated current to programming current is not within an acceptable range, the current correction subsystem 520 generates a current correction signal to node 510.

The voltage correction subsystem 530 may generate a voltage correction signal. A programming voltage may be input to pin 3 of U104-A. A reference voltage may be generated from the regulated voltage and may have a linear relationship to the regulated voltage. The reference voltage is input to pin 2 of U104-A. If the ratio of the reference voltage to the programming voltage is not within an acceptable range, the voltage correction subsystem 530 generates a voltage correction signal to node 510. Because the reference voltage has a linear relationship to the reference voltage, it follows that if the regulated voltage to programming voltage ratio is not within an acceptable range, the voltage correction subsystem 530 may generate a voltage correction signal to node 510.

The soft start lockout detector 540 is illustrated in FIG. 4(d). The overvoltage lockout detector 542 identifies if DC input voltage is too high. The soft start system 544 ramps up the voltage during the starting of the system in a controlled manner.

The converter may also output a reference voltage on pin 5 492. U104-D generates the reference voltage. In the embodiment of the invention illustrated in FIG. 4(d), the reference voltage has a value of +5 volts.

The waveform generator 449 (see FIG. 4(c)) may generate the oscillating signal utilized by the buck regulator 472 and the switching devices 420, 422, 430, and 432 (see FIG. 4(b)). The waveform generator 449 generates an oscillating signal having a frequency that is the same of the frequency being output by driving device U1 of the switching device 410 (see FIG. 4(a)). Driving device U1 of the switching device U1 generates the clocking frequency upon startup of the power converter and this frequency is transferred to the waveform generator 449 through a winding 447 off the transformer 412.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method to output a regulated voltage from a power converter, comprising:
   directly receiving a DC input voltage at a center tap of a secondary winding of the transformer, the transformer being coupled to a first switching device and also including a primary winding, the center tap of the transformer separating the secondary winding of the transformer into a first autowinding and a second autowinding;
   charging a first capacitor to a first DC voltage corresponding to the DC input voltage by coupling the DC input voltage across the first capacitor;
   charging a second capacitor to a second DC voltage corresponding to the DC input voltage by utilizing a control circuit and second switching devices to control the first autowinding and the second autowinding of the transformer to apply the second voltage across the second capacitor; and
   adding at a first node, the first DC voltage and the second DC voltage to generate a third DC voltage, wherein the first switching device and the second switching devices are driven by signals operating at a common frequency.

2. The method of claim 1, further including receiving the third DC voltage at a buck regulator;
   creating a regulated voltage at the buck regulator; and
   outputting the regulated voltage as an output voltage.

3. The method of claim 2, further including receiving a programming signal at an error correction subsystem;
   receiving regulated signals at the error correction subsystem, the regulated signals derived from the output voltage;
   comparing the programming signal with one of the regulated signals to determine if a ratio of the one of the regulated signals to the programming signal is within an acceptable range; and
   outputting a correction signal if the ratio of the one of the regulated signals to the programming signal is outside the acceptable range.

4. The method of claim 3, wherein the programming signal is a voltage programming signal and the one of the regulated signals is a regulated voltage.

5. The method of claim 3, wherein the programming signal is a current programming signal and the one of the regulated signals is a regulated current.

6. The method of claim 1, wherein the third DC voltage has a value approximately twice the value of the DC input voltage.

7. A power converter, comprising:
   a transformer, said transformer having a primary winding and a secondary winding, the primary winding coupled to a first switching circuit and the secondary winding including a center tap to separate the secondary winding into a first autowinding and a second autowinding, the DC input voltage being connected to the center tap of the secondary winding of the transformer;
   a first capacitor, coupled to the DC input voltage, which is charged to a first voltage corresponding to the DC input voltage; and
   a control circuit coupled to a second switching circuit, the second switching circuit coupled to the secondary winding, wherein the control circuit and the second switching circuit control the first autowinding and the second autowinding to charge a second capacitor to a second DC voltage corresponding to the DC input voltage, wherein the first DC voltage and the second DC voltage are added together to create a third DC voltage, and the first switching circuit and the second switching circuit are driven by signals having a common frequency.

8. The power converter of claim 7, wherein an AC input voltage is input to the power converter simultaneously with the DC input voltage.

9. The power converter of claim 7, further including a buck regulator to receive the third DC voltage, generate a regulated voltage, and output the regulated voltage as an output voltage.

10. The power converter of claim 9, further including a voltage error system to receive a programming voltage and a value representative of the regulated voltage, and to output a voltage correction signal to the buck regulator based on a ratio between the programming voltage and the value representative of the regulated voltage.

11. The power converter of claim 9, further including an error correction system to receive a programming current and a value representative of the regulated current, and to output a correction signal to the buck regulator based on a ratio between the programming current and the value representative of the regulated current.

12. A power converter, comprising:
a transformer, coupled to a first switching circuit, said transformer having a primary winding and a secondary winding, the primary winding coupled to a first switching circuit and the secondary winding including a center tap to separate the secondary winding into a first autowinding and a second autowinding, the DC input voltage being directly applied to the center tap of the secondary winding of the transformer; and
a control circuit, coupled to a second switching circuit, the second switching circuit coupled to the secondary winding, wherein the control circuit and the second switching circuit control the first autowinding and the second autowinding to output a combined voltage, the combined voltage being an addition of a voltage across the first autowinding and a voltage across the second autowinding, wherein the first switching circuit and the second switching circuit operate at a common frequency.

13. The power converter of claim 12, further including a buck regulator to receive the combined voltage, to generate a regulated voltage, and to output the regulated voltage as an output voltage.

14. The power converter of claim 13, further including a voltage error system to receive a programming voltage and a value representative of the regulated voltage, and to output a voltage correction signal to the buck regulator based on a ratio between the programming voltage and the value representative of the regulated voltage.

15. The power converter of claim 13, further including an error correction system to receive a programming current and a value representative of a regulated current, and to output a correction signal to the buck regulator based on a ratio between the programming current and the value representative of the regulated current.

16. A method to output a regulated voltage from a power converter, comprising:
receiving a DC input voltage at a center tap of a secondary winding of a transformer, the transformer also having a primary winding coupled to a first switching circuit, the center tap of the secondary winding dividing the transformer into a first autowinding and a second autowinding;
driving a second switching circuit from a control circuit, the second switching circuit coupled to the secondary winding, wherein the control circuit and the second switching circuit control the first autowinding and second autowinding to output a combined voltage, the combined voltage being an addition of a voltage across the first autowinding and a voltage across the second autowinding, wherein the first switching circuit and the second switching circuit are driven to operate at a common frequency; and
outputting the combined voltage as a DC output voltage.

17. The method of claim 16, further including receiving the DC output voltage at a buck regulator;
creating a regulated voltage at the buck regulator; and
outputting the regulated voltage to an electronic device.

18. The method of claim 17, further including receiving a programming signal at an error correction system;
receiving regulated signals at the error correction system;
comparing the programming signal with one of the regulated signals to determine if a ration of the one of the regulated signals to the programming signal is within an acceptable range; and
outputting a correction signal if the ratio of the one of the regulated signals to the programming signal is outside the acceptable range.

19. The method of claim 18, wherein the programming signal is a voltage programming signal and the one of the regulated signals is a signal representative of the regulated voltage.

20. The method of claim 18, wherein the programming signal is a current programming signal and the one of the regulated signals is a regulated current.

* * * * *